(12) United States Patent
Smith et al.

(10) Patent No.: US 8,405,750 B2
(45) Date of Patent: Mar. 26, 2013

(54) IMAGE SENSORS AND IMAGE RECONSTRUCTION METHODS FOR CAPTURING HIGH DYNAMIC RANGE IMAGES

(75) Inventors: Scott Smith, Saratoga, CA (US); Peng Lin, Pleasanton, CA (US); Christopher Zeleznik, Los Gatos, CA (US); Laura Savidge, Santa Clara, CA (US)

(73) Assignee: Aptina Imaging Corporation, George Town (KY)

( * ) Notice: Subject to any disclaimer, the term of this patent is extended or adjusted under 35 U.S.C. 154(b) by 433 days.

(21) Appl. No.: 12/480,651

(22) Filed: Jun. 8, 2009

(65) Prior Publication Data

US 2010/0309333 A1 Dec. 9, 2010

(51) Int. Cl.
*H04N 5/335* (2006.01)
*G03B 7/00* (2006.01)

(52) U.S. Cl. .................... 348/308; 348/362

(58) Field of Classification Search ........... 348/294–324
See application file for complete search history.

(56) References Cited

U.S. PATENT DOCUMENTS

| | | | | |
|---|---|---|---|---|
| 5,144,442 A * | 9/1992 | Ginosar et al. | ............. | 348/222.1 |
| 5,247,366 A * | 9/1993 | Ginosar et al. | ................. | 348/256 |
| 6,518,558 B1 * | 2/2003 | Bohm et al. | ................. | 250/208.1 |
| 7,382,407 B2 | 6/2008 | Cho et al. | | |
| 7,397,509 B2 | 7/2008 | Krymski | | |
| 7,911,518 B2 * | 3/2011 | Yosefin | ........................ | 348/273 |
| 8,013,919 B2 * | 9/2011 | Yaffe et al. | .................... | 348/308 |
| 2002/0180875 A1 * | 12/2002 | Guidash | ........................ | 348/280 |
| 2003/0038296 A1 * | 2/2003 | Merrill | ............................. | 257/98 |
| 2003/0103158 A1 * | 6/2003 | Barkan et al. | ................. | 348/362 |
| 2003/0169359 A1 * | 9/2003 | Merrill et al. | ................. | 348/308 |
| 2004/0189844 A1 * | 9/2004 | McCaffrey et al. | ........... | 348/308 |
| 2005/0045980 A1 * | 3/2005 | Guidash | ........................ | 257/432 |
| 2005/0128327 A1 * | 6/2005 | Bencuya et al. | .............. | 348/308 |
| 2005/0167574 A1 * | 8/2005 | He et al. | .................... | 250/214 R |
| 2006/0145203 A1 * | 7/2006 | Toros et al. | .................... | 257/291 |
| 2006/0192867 A1 * | 8/2006 | Yosefin | ........................ | 348/273 |
| 2007/0040922 A1 * | 2/2007 | McKee et al. | ................. | 348/308 |
| 2007/0285526 A1 | 12/2007 | Mann et al. | | |
| 2008/0158398 A1 * | 7/2008 | Yaffe et al. | .................... | 348/294 |
| 2008/0219585 A1 | 9/2008 | Kasai et al. | | |
| 2008/0267522 A1 | 10/2008 | Kobayashi | | |
| 2009/0021612 A1 | 1/2009 | Hamilton et al. | | |
| 2009/0040349 A1 | 2/2009 | Xu | | |
| 2009/0040364 A1 | 2/2009 | Rubner | | |
| 2009/0256942 A1 * | 10/2009 | McCaffrey et al. | ........... | 348/308 |
| 2009/0268063 A1 * | 10/2009 | Ellis-Monaghan et al. | .. | 348/246 |
| 2009/0273696 A1 * | 11/2009 | Krymski | ........................ | 348/302 |

* cited by examiner

*Primary Examiner* — Sinh Tran
*Assistant Examiner* — Selam Gebriel
(74) *Attorney, Agent, or Firm* — Treyz Law Group; David C. Kellogg

(57) ABSTRACT

High dynamic range image sensors and image reconstruction methods for capturing high dynamic range images. An image sensor that captures high dynamic range images may include an array of pixels having two sets of pixels, each of which is used to capture an image of a scene. The two sets of pixels may be interleaved together. As an example, the first and second sets of pixels may be formed in odd-row pairs and even-row pairs of the array, respectively. The first set of pixels may use a longer exposure time than the second set of pixels. The exposures of the two sets of pixels may at least partially overlap in time. Image processing circuitry in the image sensors or an associated electronic device may de-interlace the two images and may combine the de-interlaced images to form a high dynamic range image.

17 Claims, 16 Drawing Sheets

IMAGE SENSORS AND IMAGE RECONSTRUCTION METHODS FOR CAPTURING HIGH DYNAMIC RANGE IMAGES

BACKGROUND

The present invention relates to image sensors and, more particularly, to image sensors and image reconstruction methods for capturing high dynamic range images.

Modern electronic devices such as cellular telephones, cameras, and computers often use digital image sensors such as high dynamic range image sensors. Image sensors may sometimes be referred to herein as imagers. Imagers (i.e., image sensors) may be formed from a two-dimensional array of pixels. Each pixel can be configured to receive incident photons (light) and to convert the incident photons into electrical signals.

High dynamic range imagers are designed to capture scenes with light ranges that exceed the typical dynamic range of an individual linear pixel or an analog-to-digital converter. The dynamic range of a pixel can be defined as the ratio of minimum luminance or brightness in an image which causes the pixel to saturate to the brightness in an image at which the pixel achieves a signal-to-noise ratio (SNR) equal to one. The dynamic range of a scene can be expressed as the ratio of its highest illumination level to its lowest illumination level.

Examples of commonly used techniques for capturing high dynamic range images include combining multiple exposures of varying exposure times, utilizing partial reset level techniques, and providing pixels with logarithmic or other non-linear responses. With a multiple exposure technique, an image sensor takes a first long exposure and then takes a second short exposure. The two exposures are then combined into a high dynamic range image. However, because the two exposures are taken at different times, the image sensor is incapable of capturing scenes that include fast moving objects. In addition, the conventional digital image sensors require excessive amounts of storage (e.g., buffer memory or additional in-pixel storage nodes), thereby increasing the cost of devices that include such sensors.

It would therefore be desirable to provide improved digital sensors and image reconstruction methods for creating high dynamic range images.

DETAILED DESCRIPTION

The present invention relates to image sensors and, more particularly, to image sensors and image reconstruction methods for capturing high dynamic range images.

Modern electronic devices such as cellular telephones, cameras, and computer often use digital image sensors. As one example, the electronic devices may include one or more high dynamic range (HDR) image sensors that are designed to captures scenes with light ranges that exceed the typical dynamic range of a linear pixel or an analog-to-digital converter. With this type of arrangement, a high dynamic range image sensor may be used to capture a scene with light ranges that exceed the dynamic range of any single pixel in the image sensor.

In one embodiment, a high dynamic range image sensor may include an array of pixels configured to capture two images of a scene at least partially simultaneously. As one example, the array may include a first set of pixels in odd numbered row pairs of the array (e.g., rows 0, 1, 4, 5, 8, 9, etc.) that can be used to capture a first image of the scene and a second set of pixels in even numbered row pairs of the array (e.g., rows 2, 3, 6, 7, 10, 11, etc.) that can be used to capture a second image of the scene. The even-numbered row pairs and the odd-numbered row pairs may sometimes be referred to herein as adjacent rows (e.g., as rows 0 and 1 are adjacent to each other, rows 2 and 3 are adjacent to each other, etc.). The first set of may use a first integration time (i.e., a first exposure time) in capturing the first image. The second set of pixels may use a second integration time (that may be shorter than the first integration time) in capturing the second image. The integration times of the two sets of pixels may overlap somewhat. For example, there may be at least one moment in which both sets of pixels are integrating light from the scene. By capturing two images of the scene using two different integration times, the high dynamic ranging image sensor may be able to generate a high dynamic range image.

Figure 1:
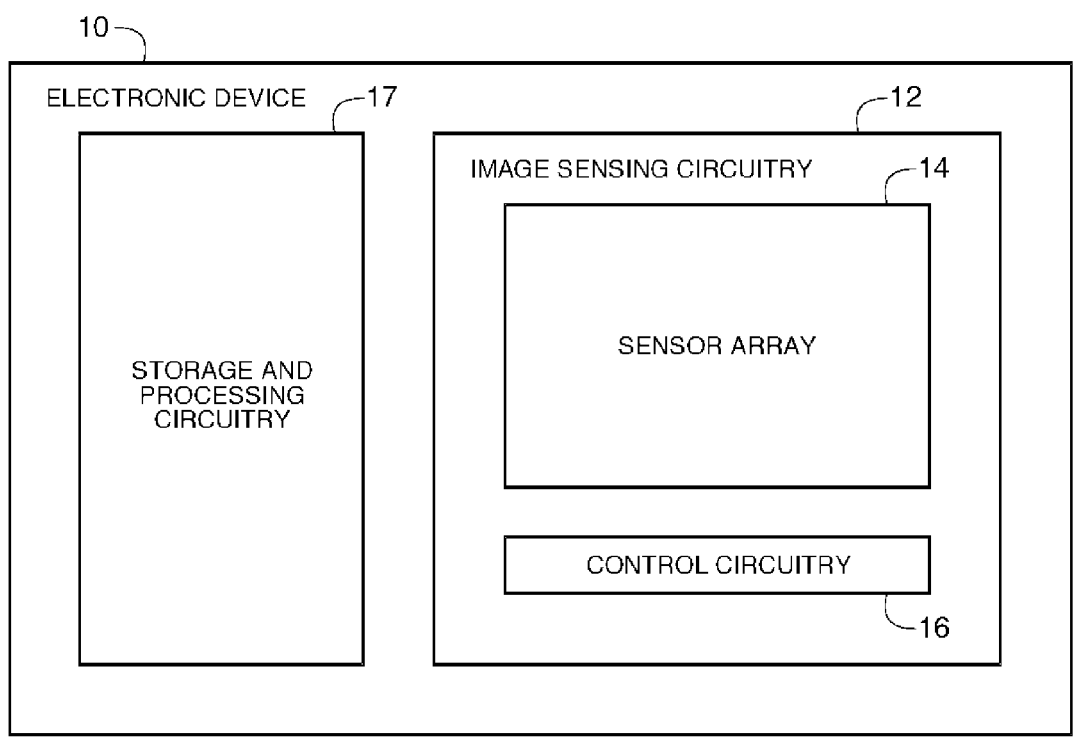
FIG. 1 is a schematic diagram of an illustrative electronic device that may include high dynamic range image sensing circuitry in accordance with an embodiment of the present invention.

An illustrative electronic device that may include high dynamic range image sensing circuitry is shown in FIG. 1. User device 10 may be any electronic device such as a cellular telephone, a camera, a desktop computer, a laptop computer, a handheld gaming device, a hybrid device that combines the functionality of multiple devices, and may be provided in the form of any electronic equipment (in general).

Device 10 may include image sensing circuitry 12. Image sensing circuitry 12 may include one or more integrated circuits and other components as desired. For example, image sensing circuitry 12 may include an array of light sensitive pixels such as sensor array 14. Each of the light sensitive pixels may convert incident light to an electrical signal. As one example, each of the pixels may be formed from a photodetector such as a photodiode with a light sensitive region and may be configured to produce and store (e.g., to accumulate) a charge proportional to the number of photons that impinge upon the light sensitive region. Image sensing circuitry 12 may also include control circuitry 16 that controls the operation of image sensing circuitry 12 and, in particular, that controls the operation of sensor array 14. As examples, control circuitry 16 may be used to reset light sensitive pixels in sensor array 14 (e.g., to remove accumulated image charges from the light sensitive pixels during a reset operation), to read out image data from the light sensitive pixel (e.g., to measure the accumulated charges of the pixels during a readout operation), to transfer accumulated charges to charge storage elements in the pixel array (e.g., to transfer the charge accumulated by each pixel into corresponding in-pixel storage elements as part of a readout operation or reset operation), etc. If desired, control circuitry 16 may include one or more analog-to-digital converters that can be used to convert analog signals from the sensor array 14 to digital signals that can be processed by digital circuits in device 10.

Storage and processing circuitry 17 may be included in device 10. Storage and processing circuitry 17 may include one or more different types of storage such as hard disk drive storage, nonvolatile memory (e.g., flash memory or other electrically-programmable-read-only memory), volatile memory (e.g., battery-based static or dynamic random-access-memory), etc. Processing circuitry in storage and processing circuitry 17 may be used to control the operation of device 10 and image sensing circuitry 12. Processing circuitry 17 may be based on a processor such as a microprocessor and other integrated circuits. For example, storage and processing circuitry 17 may be used to run software on device 10, such as image processing applications, image display applications, operating system functions, power management functions, etc. Storage and processing circuitry 17 may be used to store image data such as high dynamic range images captured by sensor array 14 of image sensing circuitry 12. If desired, storage and processing circuitry 17 may be used to store image data during image processing operations.

Sensor array 14 may be formed from a plurality of pixels and may be organized using any architecture. As an example, the pixels of sensor array 14 may be organized in a series of rows and columns. The pixels of array 14 may be interconnected by various conductors (e.g., conductors arranged horizontally may interconnect rows of sensors and conductors arranged vertically may interconnect columns of sensors). The conductors may include global conductive lines that span substantially all of the sensors of array 14.

Figure 2:
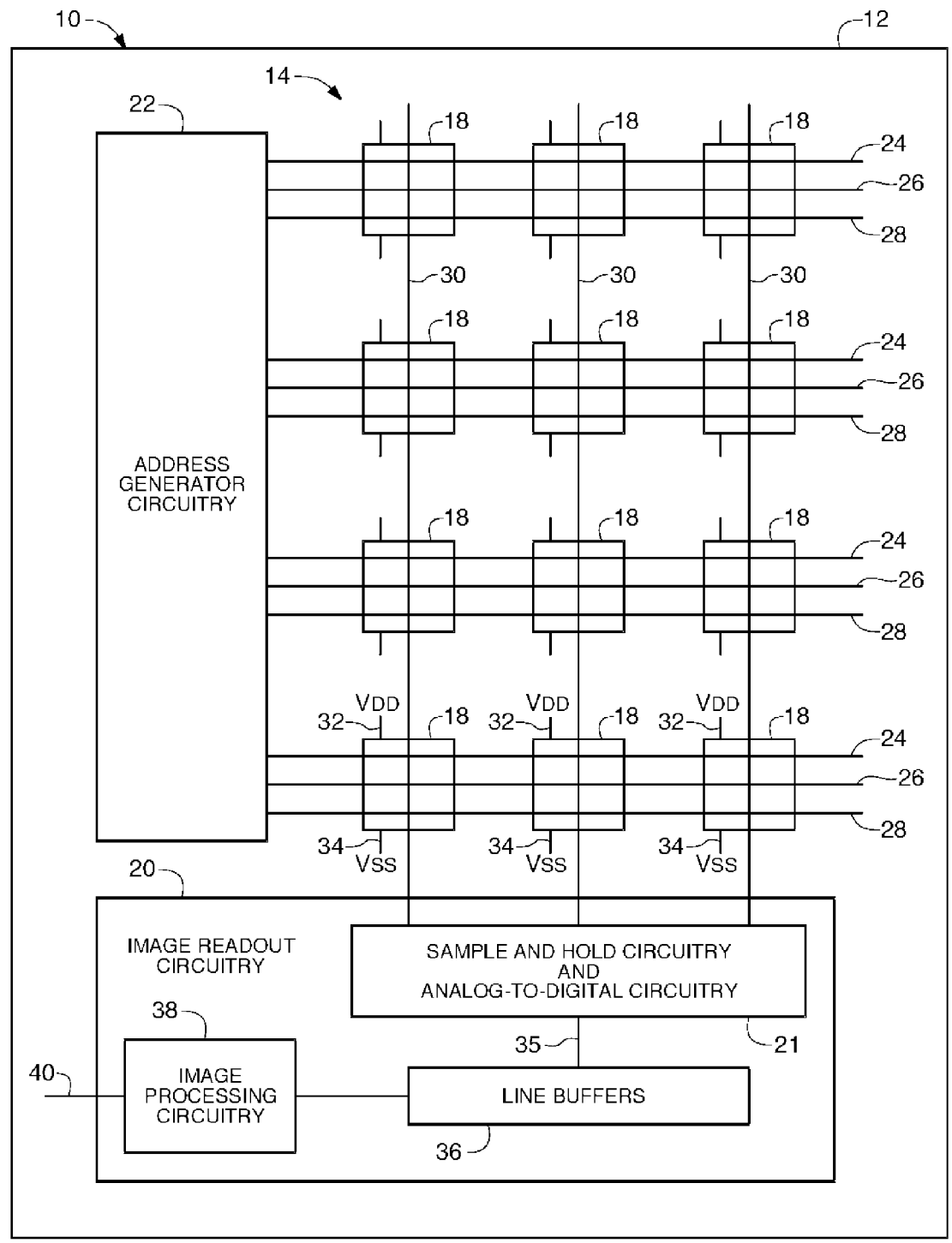
FIG. 2 is a schematic diagram of an illustrative array of pixels and control circuitry coupled to the array of pixels in accordance with an embodiment of the present invention.

An example of an arrangement for sensor array 14 is shown in FIG. 2. As shown in FIG. 2, device 10 may include an array 14 of pixels 18 coupled to image readout circuitry 20 and address generator circuitry 22. As an example, each of the pixels 18 in a row of array 14 may be coupled to address generator circuitry 22 by one or more conductive lines such as lines 24, 26, and 28. Array 14 may have any number of rows and columns. In general, the size of array 14 and the number of rows and columns in array 14 will depend on the particular implementation.

As one example, lines 24 may be reset lines that can be used to couple the pixels 18 in a particular row to a power supply terminal such as positive power supply terminals 32 or ground power supply terminals 34 to reset the pixels 18. In one example, accumulated charges on the pixels 18 may be erased by connecting the pixels 18 to a power supply terminal such as terminal 32 and/or 34 and allowing accumulated charges to dissipate into power supply lines in circuitry 12. If desired, circuitry 12 may include a global reset line that resets all of the pixels 18 in array 14 simultaneously. With this type of arrangement, the reset lines 24 may be connected together to form a single global reset line. Reset lines 24 may carry signals that control reset transistors in pixels 18 and that are sometimes referred to as pixel reset pointers.

Control lines 26 may be used to control transfer transistors in the pixels 18. For example, control lines 26 may be transfer lines that are used to transfer accumulated charges in the pixel 18 from light sensitive devices (e.g., photodiodes or other light sensitive devices) to storage elements (e.g., floating diffusion nodes or other storage elements) in the pixels 18. When array 14 implements an electronic rolling shutter readout, the accumulated charges of a particular row may be read out shortly after the accumulated charges are transferred to the storage elements of the pixels 18 in that particular row. If desired, the accumulated charges may be read out as the accumulated charges are transferred to the storage elements.

If desired, the control lines 26 may be connected together to form one or more global transfer lines. With this type of arrangement, a global transfer line 26 may be used to implement a global shutter scheme in which the accumulated charges from a plurality of pixels 18 in different rows of array 14 are simultaneously transferred to the respective storage elements in each of the pixels 18. The accumulated charges may then be read out from the storage elements at a later time. Transfer lines 26 may convey signals sometimes referred to as transfer pointers or global transfer pointers (as examples).

With one arrangement, transfer lines 26 may be used in conjunction with reset lines 24 during a reset operation of the pixels 18. As one example, transfer signals on transfer lines 26 and reset signals on reset lines 24 may both asserted simultaneously during a reset operation (e.g., so that the reset operation discharges accumulated charges from the storage elements and the light sensitive devices in each of the pixels 18).

Control lines 28 may be, for example, connected to readout transistors in the pixels 18 of array 14. With this type of arrangement, row select signals, sometimes referred to herein as readout signals and pixel read pointers, may be asserted on control lines 28 to connect a row of pixels 18 to image readout circuitry 20. For example, when row select signals are asserted on a given control line 28, the pixels 18 associated with the given control line 28 may be coupled to image readout circuitry 20 through column readout lines 30. When a row of pixels 18 is coupled to image readout circuitry 20, signals representative of the accumulated charge on the pixels 18 may be conveyed over column readout lines 30 to circuitry 20 (e.g., analog-to-digital converters that convert the signals from the image sensing pixels 18 to digital signals).

Address generator circuitry 22 may generate signals on control paths 24, 26, and 28, as desired. For example, address generator circuitry 22 may generate reset signals on paths 24, transfer signals on paths 26, and row select (e.g., row readout) signals on paths 28 to control the operation of array 14. Address generator circuitry 22 may be formed from one or more integrated circuits. If desired, address generator circuitry 22 and array 14 may be integrated together in a single integrated circuit (as an example).

Image readout circuitry 20 may include circuitry 21, line buffers 36 and image processing circuitry 38. Circuitry 21 may include sample and hold circuitry and analog-to-digital converter circuitry. As one example, circuitry 21 may be used to measure the charges of pixels 18 from a row of array 14 and may be used to hold the charges while analog-to-digital converters in circuitry 21 convert the charges to digital signals. The digital signals may be representative of the accumulated charges from the pixels 18. The digital signals produced by the analog-to-digital converters of circuitry 21 may be conveyed to line buffers 36 (e.g., short-term storage) over path 35.

Line buffers 36 may be used to temporarily store digital signals from circuitry 21 for use by image processing circuitry 38. In general, image readout circuitry 20 may include any number of line buffers 36. For example, each line buffer 36 may hold digital signals representative of the charges read from each of the pixels 18 in a given row of array 14.

Image processing circuitry 38 may be used to process the digital signals held in line buffers 36 to produce output data on path 40. If desired, the output data may include image data encoded in any format that can be stored in storage and processing circuitry 17 and displayed by device 10 or transferred to another electronic device or other external computing equipment as desired.

Figure 3:
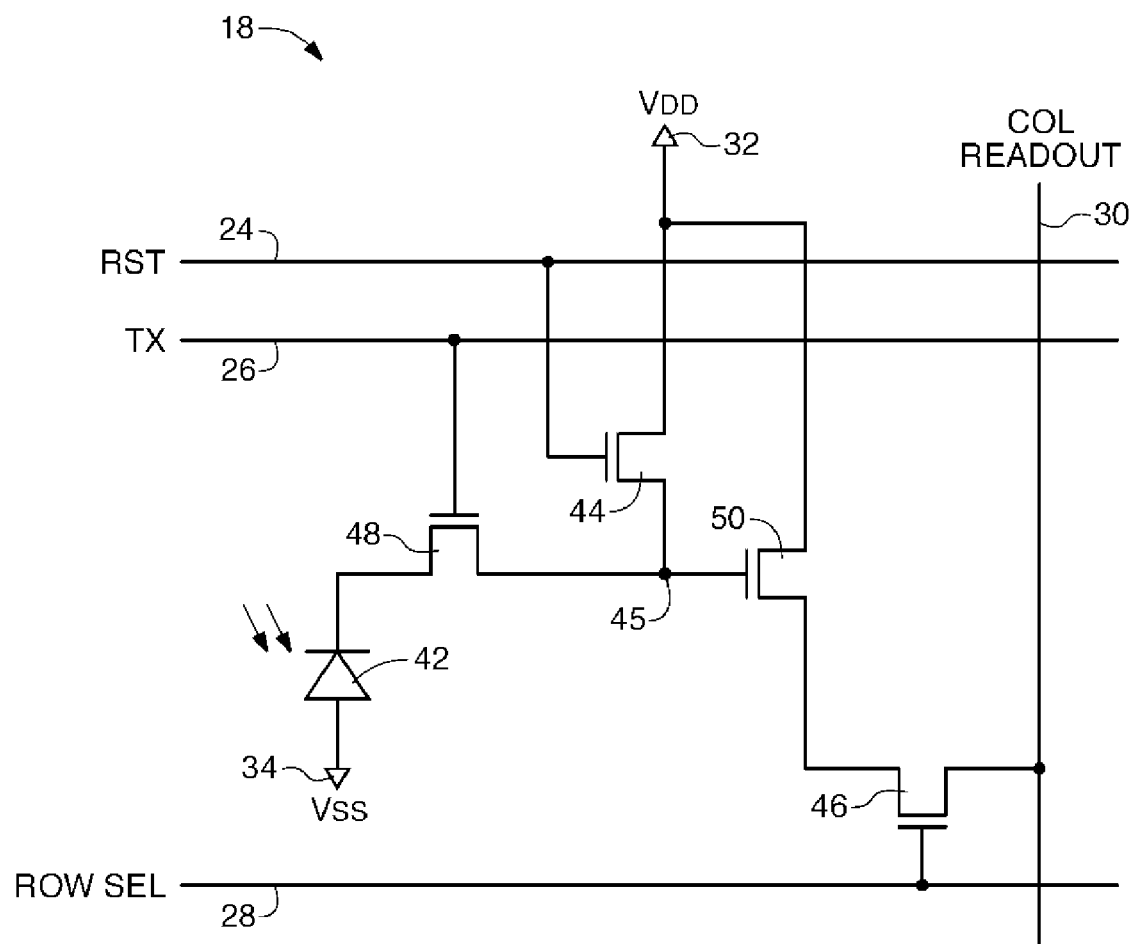
FIG. 3 is a schematic diagram of an illustrative light-sensitive pixel that may be a part of high dynamic range image sensing circuitry in accordance with an embodiment of the present invention.

An example of an image sensing pixel 18 that may be used in array 14 of FIG. 2 is shown in FIG. 3. As shown in FIG. 3, pixel 18 may include transistors such as transistors 44, 46, 48, and 50. Pixel 18 may include a photosensitive device such as photodiode 42 (sometimes referred to herein as a photosensitive element). In general, it is typically desirable to maximize the light collecting area of the photosensitive device 42 relative to the total area of each pixel 18. This type of arrangement helps to maximize the sensitivity of image sensing circuitry 12 (FIG. 2) to incident light.

The photosensitive device 42 in each pixel 18 of array 14 may accumulate charge in response to incident light (e.g., light which strikes the photosensitive device 42). With one arrangement, the time between a reset operation in which the accumulated charge is reset and a readout operation or a transfer operation (in which the accumulated charge is shifted to a storage element such as floating diffusion node 45) may be referred to herein as an integration time or an exposure time. The accumulated charge generated by the photosensitive device 42 may be proportional to the intensity of the incident light and the integration time. In general, relatively long integration times may be used to capture scenes with relatively low intensities (e.g., to ensure that the accumulated charge is sufficient to overcome noise in array 14) and relatively short integration times may be used to capture scenes with relatively high intensities (e.g., to ensure that the accumulated charge does not reach a saturation point).

Reset transistor 44 may be controlled by reset line 24. When reset signals (RST) on reset line 24 are asserted, transistor 44 may be turned on and may allow accumulated charge on diffusion node 45 to flow into a power supply line (e.g., through power supply terminal 32). In one embodiment, transfer signals (TX) on transfer line 26 may be asserted simultaneously with the reset signals (RST) such that the accumulated charges on both the photosensitive element 42 and the diffusion node 45 are reset.

Transfer transistor 48 may be controlled by transfer line 26. When transfer signals (TX) on transfer line 26 are asserted, transistor 48 may be turned on and may allow accumulated charge from photodiode 42 to flow to other transistors in the pixel 18 or to a storage element such as the floating diffusion node 45. For example, transistor 48 may be turned on during a reset operation to allow the accumulated charge from photodiode 42 to flow throw node 45 and transistor 44 to power supply terminal 32. As another example, transistor 48 may be turned on prior to a readout operation to allow the accumulate charge from photodiode 42 to flow to the diffusion node 45. If desired, transistor 48 may be turned on during a readout operation to allow the accumulated charge from photodiode 42 to flow to the gate of transistor 50 (and control the operation of transistor 50).

Buffer transistor 50 and readout transistor 46 may be used during a readout operation of the pixel 18. Readout transistor 46 may be controlled by row select (ROW SEL) signals on read line 28 and buffer transistor 50 may be controlled by the accumulated charge generated by the photodiode 42 (which may be stored in diffusion node 45). When row select signals on line 28 are asserted, transistor 46 may be turned on and the accumulated charge from the photodiode 42 may be used to control transistor 50. The voltage that the accumulated charge applies to the gate of transistor 50 may then determine the voltage of column readout (COL READOUT) line 30. Image readout circuitry 20 of FIG. 2 may then determine the voltage of the accumulate charge by sampling the voltage of line 30. If desired, the image readout circuitry 20 may utilize a correlated double sampling technique in which the reset level of the pixel 18 is also measured.

With one arrangement, array 14 of FIG. 2 may use alternating pairs of rows in an interlaced pattern to obtain image data that can be used to capture high dynamic range scenes. With one arrangement, an interleaved multiple exposure technique may be utilized to capture high dynamic range images. With this type of arrangement, multiple exposures are captured using an array 14 that has pixels 18 formed in an interleaved pattern such that each image sensing pixel 18 receives only one of the exposures. For example, half of the pixels 18 in array 14 may be integrated (i.e., exposed) for time T1 and half of the pixels 18 in array 14 may be integrated for time T2. With this type of arrangement, array 14 may be use to capture two images of a scene using two different exposures that overlap at least partially in time. While typically described herein as including two exposures, in general array 14 may be used to capture any number of exposures (e.g., three exposures, four exposures, five exposures, etc.) at least partially simultaneously.

Figure 4:
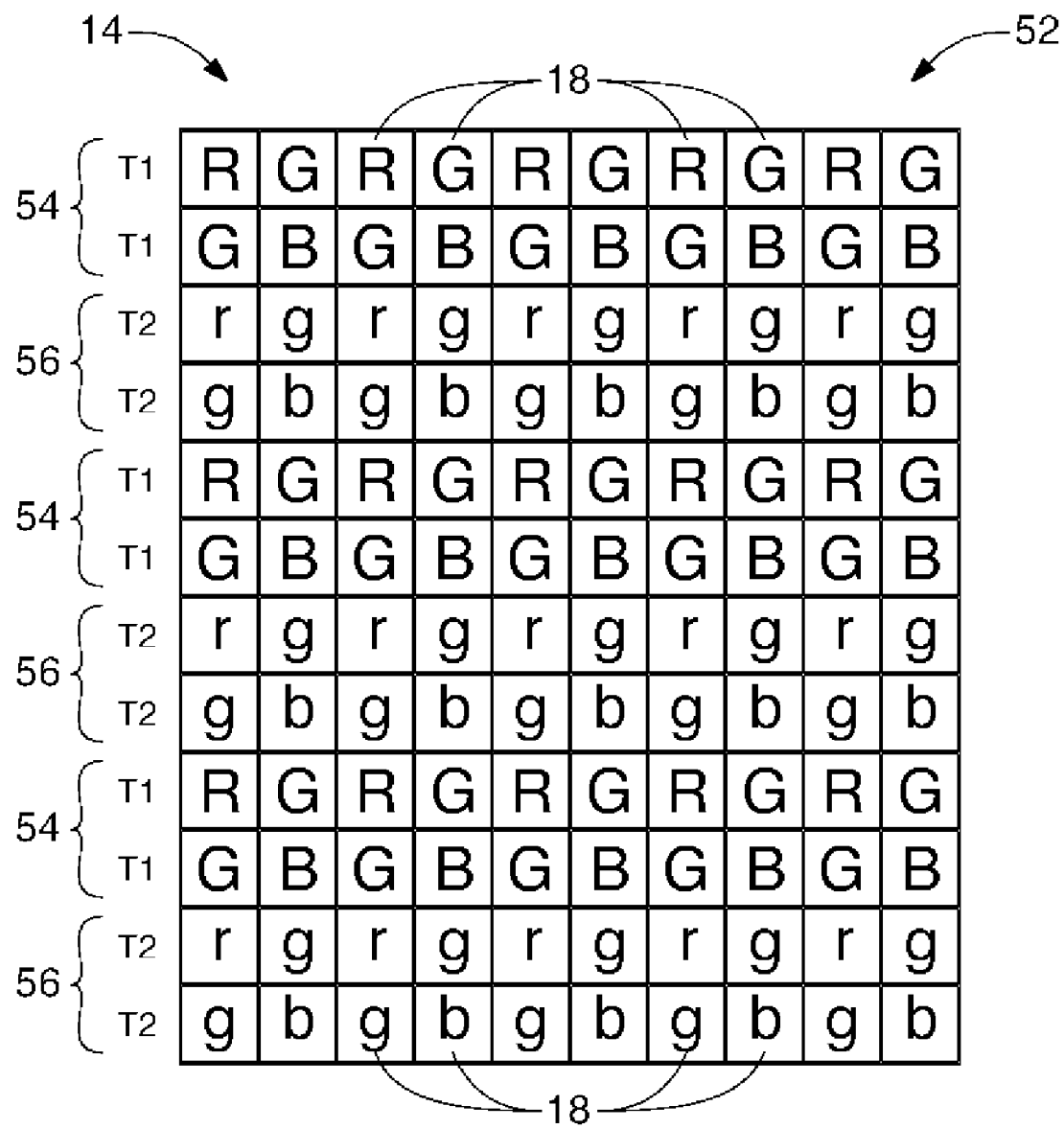
FIG. 4 is a diagram of an illustrative color filter array and an array of pixels that may include pairs of rows of pixels that alternate between a short and a long exposure time and that can be used to capture a high dynamic range image in accordance with an embodiment of the present invention.

An embodiment for capturing high dynamic range images is illustrated in FIG. 4. FIG. 4 shows an illustrative color filter array 52 which uses the well known Bayer filter pattern for red, blue, and green pixels (e.g., 50% green, 25% red, and 25% blue). As an example, color filter array 52 may be overlaid on top of the image sensor array 14. In the arrangement of FIG. 4, one or more pixels 18 may be located under each of the squares of the color filter array 52. In addition, when capturing a high dynamic range image, row pairs 54 may be integrated (i.e., exposed) for time T1 while row pairs 56 may be integrated for time T2 when array 14 is used to capture an image of a high dynamic range scene. With this type of arrangement, the pixels 18 in row pairs 54 may be able to capture portions of a scene with low brightness levels while the pixels 18 in row pairs 56 may be able to capture portions of the scene that have high brightness levels. If desired, the pixels in row pairs 54 and in row pairs 56 may be exposed for the same amount of time when capturing a scene with low dynamic range.

The portions of filter array 52 corresponding to red, blue, and green pixels are denoted with the letters "r", "b", and "g", respectively. The portions of filter array 52 corresponding to the longer integration time T1 are denoted with capitalized versions of these letters and the portions corresponding to the shorter integration time T2 are denoted with lowercase versions of these letters. This labeling scheme for color filter arrays is used hereafter.

Figure 5:
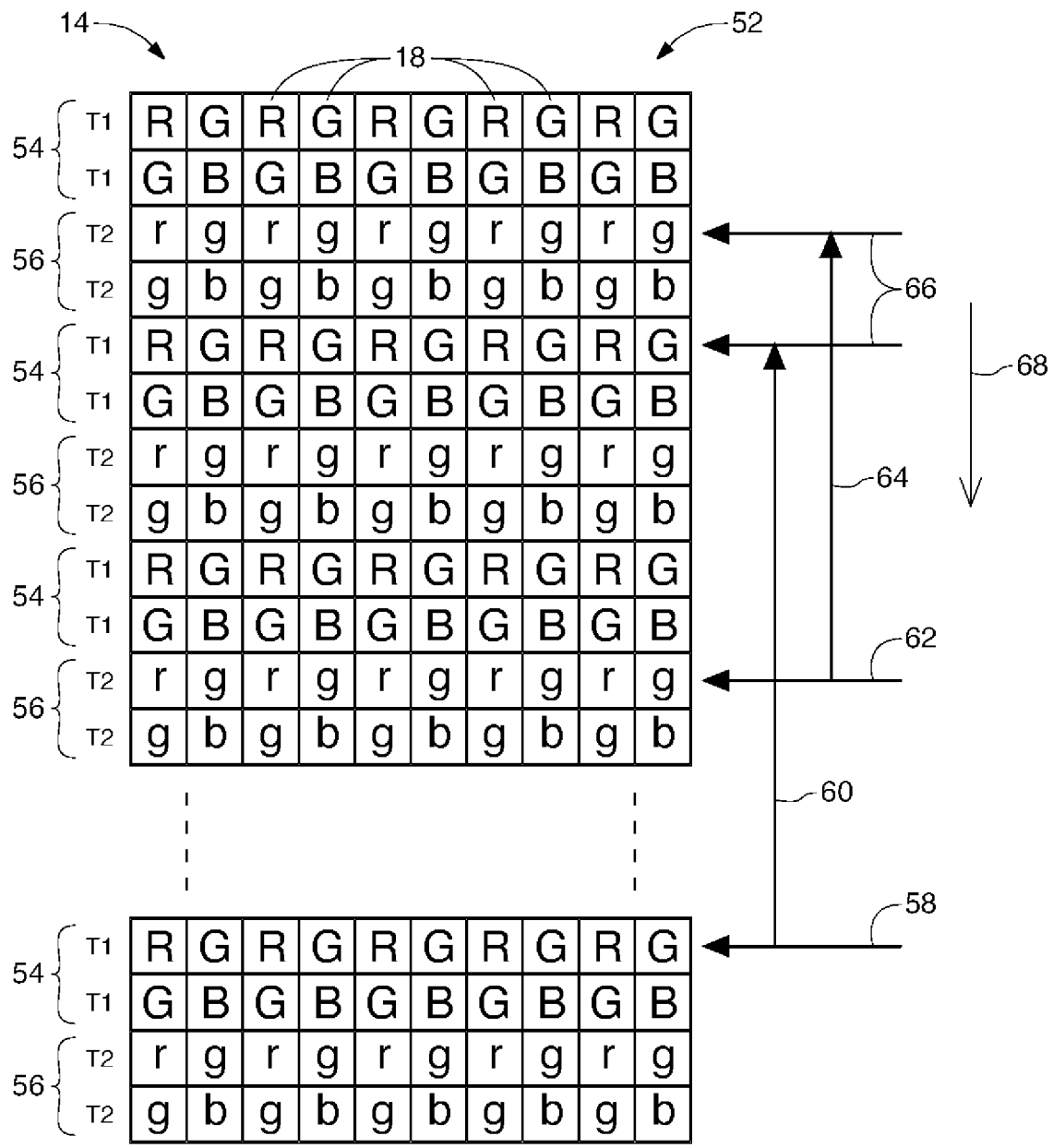
FIG. 5 is a diagram of the illustrative color filter array and the array of pixels of FIG. 4 showing how two separate reset pointers may be used to initiate the long and short exposure times when the array of pixels is being used to capture a high dynamic range image in accordance with an embodiment of the present invention.

A diagram showing how two reset pointers may be used to initiate the first and second exposures at different times in array 14 is shown in FIG. 5. The first exposure (T1) may be initiated by reset pointer 58 (e.g., signals on one of the lines 24 of FIG. 2) and the second exposure (T2) may be initiated by reset pointer 62. Following an integration time illustrated by line 60 for T1 and line 64 for T2, the pixels 18 may be readout (e.g., read transistors 46 may be turned on by readout pointers 66). This type of arrangement may be used in implementing an electronic rolling shutter in which the pointers progress through array 14 along direction 68 (as an example).

Figure 6:
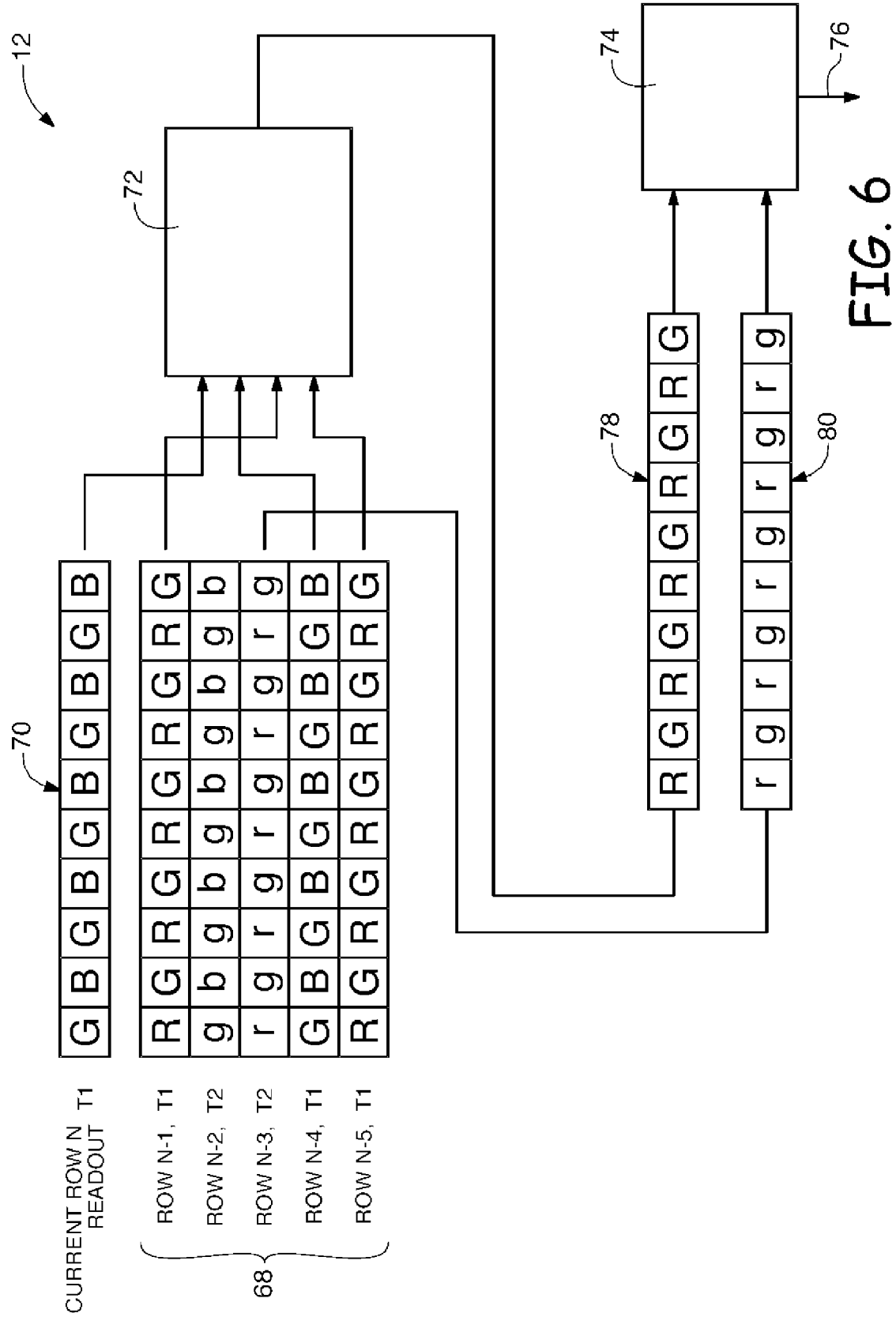
FIG. 6 is a diagram of illustrative line buffers and image processing circuitry that may be used in forming a high dynamic range image from image data received from an array of pixels such as the array of FIG. 4 in accordance with an embodiment of the present invention.

FIG. 6 shows how the image data read out from array 14 (e.g., T1 data from row pairs 54 and T2 data from row pairs 56) can be combined to form a high dynamic range image. As shown in FIG. 6, image sensing circuitry 12 may include a plurality of row buffers 68, interpolation circuitry 72, and exposure combination circuitry 74 that work together to form a high dynamic range image (which may be produced at output 76) from image data from row pairs 54 and 56. The row buffers 68 (e.g., line buffers 68) may store rows of image data from pixels 18 so that the data can be accessed by interpolation circuitry 72 (as an example). Interpolation circuitry 72 may access the data stored in buffers 68 and may utilize data from a current readout operation 70 to interpolate missing data for each of the two exposures T1 and T2. In particular, interpolation circuitry 72 may de-interlace the two exposures T1 and T2 as the two exposures are read out from array 14.

In the example of FIG. 6, the image data from a current readout of row N is used in conjunction with image data from the five line buffers 68 that store image data from previous readout operations on rows N-1, N-2, N-3, N-4, and N-5 in forming the high dynamic image produced at output 76. As an example, row N-3 of array 14 in FIG. 6 may only directly produce image data for the second exposure T2. The row N-3 image data for exposure T2 may be conveyed directly from buffers 68 to circuitry 74 (e.g., as illustrated by data 80). Row N (i.e., a current readout or data held in a buffer 68), row N-1, row N-4, and row N-5 may therefore be used to interpolate image data for row N-3 for the first exposure T1, as illustrated by data 78. The row N-3 image data from exposure T2 (illustrated by data 80) and the interpolated row N-3 image data from exposure T1 (illustrated by data 78) may then be combined into high dynamic range image data for row N-3 by circuitry 74. This process may be repeated for each row and the interpolation (i.e., de-interlacing process) may switch between restoring T1 and T2 data as necessary.

In general, the number of line buffers 68 included in image sensing circuitry 12 may be dependent on the type of interpolation used. In some cases it may be desirable to produce an output image that is sub-sampled compared to array 14. In this type of arrangement, the interpolation circuitry 72 and the combination circuitry 74 may utilize a different algorithm for reconstructing sub-sampled data. For example, array 14 may have a resolution of 2048 by 1536 and the combined high dynamic range output (e.g., output from terminal 76) may have a resolution of 1024 by 768. In this arrangement, the de-interlacing circuitry 72 may be omitted.

Figure 7:
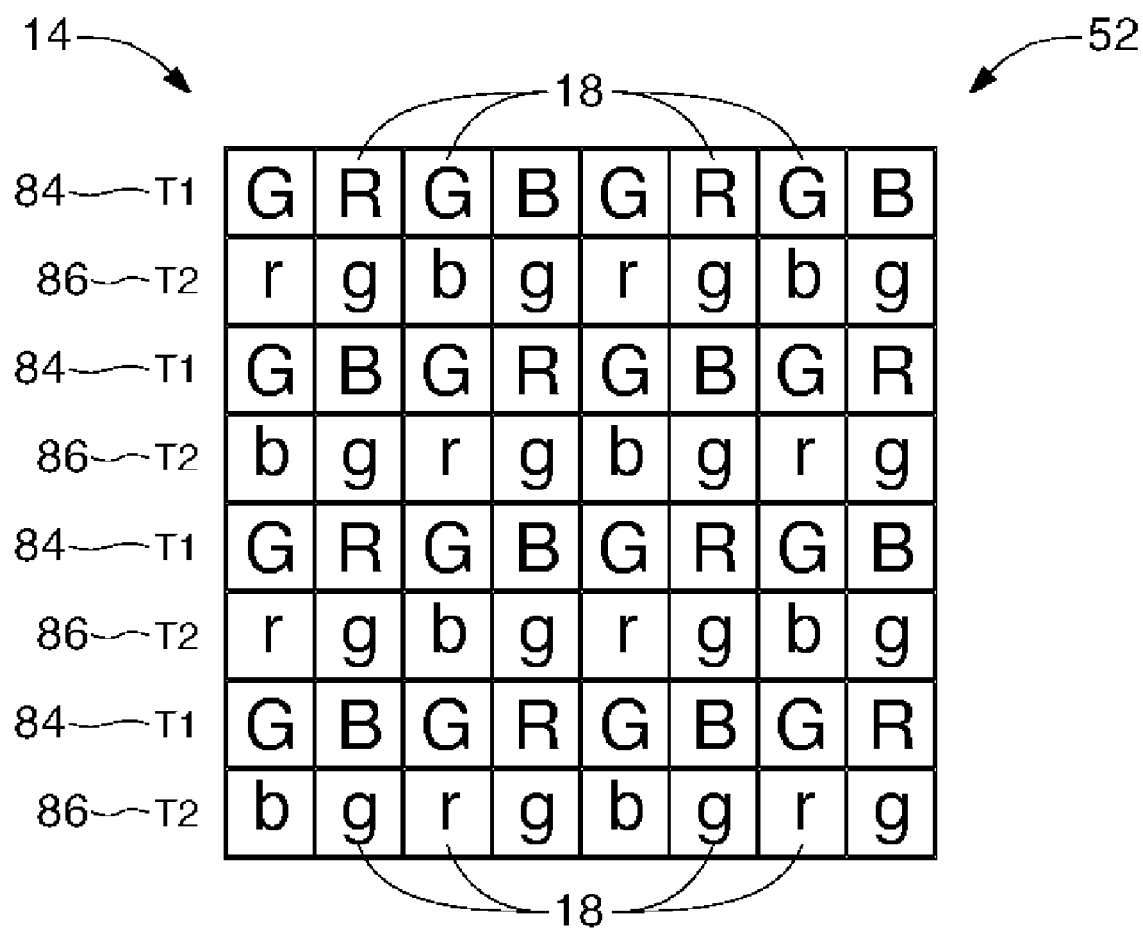
FIG. 7 is a diagram of an illustrative color filter array and an array of pixels that may include rows of pixels that alternate between a short and a long exposure time and that can be used to capture a high dynamic range image in accordance with an embodiment of the present invention.

Another embodiment for capturing high dynamic range images is illustrated in FIG. 7. FIG. 7 shows an illustrative color filter array 82 that includes red, blue, and green filters in each row of the array. This may allow the two separate exposures T1 and T2 to be obtained using alternating rows 84 and 86 of pixels 18 (rather than alternating row pairs). With this type of arrangement, all of the odd rows 84 may be exposed for a first period of time T1 and all of the even rows 86 may be exposed for a second period of time T2 in order to obtain a high dynamic range image. Alternating the rows between T1 exposures and T2 exposures in this way may help to reduce the amount of resolution loss and aliasing due to sub-sampling relative to the FIG. 4 arrangement.

The readout, row memory buffering, interpolation of missing T1 and T2 data, and combination of the T1 and T2 exposure data may be performed in a manner similar to that described in connection with FIG. 6. The interpolation algorithm and the number of row buffers 68 required may be somewhat different. In particular, the number of row buffers 68 used in the arrangement of FIG. 7 may be reduced relative to the arrangement of FIG. 6.

With one arrangement, array 14 may be implemented using a global shutter technique. In a global shutter technique, groups of the pixels 18 in array 14 may be controlled simultaneously. For example, groups of the pixels 18 may be reset simultaneously and the accumulated charges on the groups of the pixels 18 may be transferred simultaneously to storage elements in each of the pixels 18 (e.g., floating diffusion nodes such as node 45 or other storage elements such as capacitors in each of the pixels 18). A global shutter technique is generally preferable when capturing scenes that include fast motion as an electronic rolling shutter technique may introduce image artifacts such as a skewed image when a scene includes fast motion.

Figure 8:
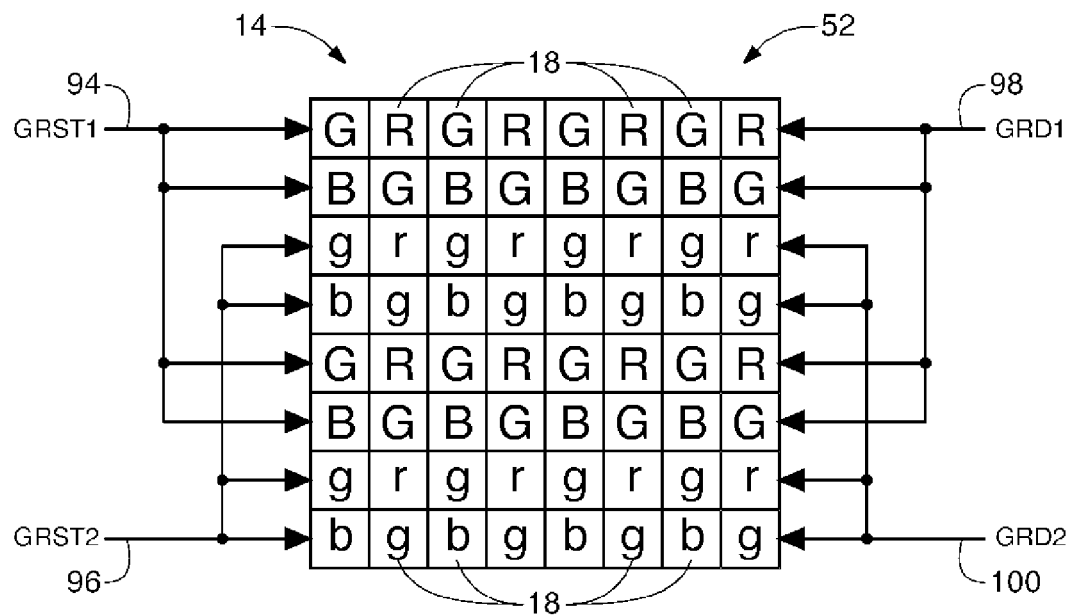
FIG. 8 is a diagram of the illustrative color filter array and the array of pixels of FIG. 4 that shows how a pair of global reset lines and a pair of global transfer lines may be used in implementing a global shutter readout of the array of pixels in accordance with an embodiment of the present invention.

One potential way in which array 14 may implement a global shutter scheme is shown in FIG. 8. In the example of FIG. 8, a pair of global reset lines 94 and 96 and a pair of global transfer lines 98 and 100 may be used to control the operation of array 14. While the example of FIG. 8 illustrates a global shutter scheme for color filter array pattern 54 of FIG. 4, in general array 14 may implement similar global shutter schemes for any arrangement such as the alternative arrangement of FIG. 7.

Global reset lines 94 and 96 may convey global reset signals such as GRST1 and GRST2 to array 14. Because there are two separate global reset lines 94 and 96, the arrangement of FIG. 8 allows two separate reset operations to occur. With one arrangement, the first reset operation may occur when GRST1 signals are asserted on line 94 and the pixels 18 associated with a first exposure (T1) are reset. The second reset operation may occur when GRST2 signals are asserted on line 96 and the pixels 18 associated with a second exposure (T2) are reset. The two reset operations may occur independently in time.

Global transfer lines 98 and 100 may convey global transfer signals such as GRD1 and GRD2 to array 14. Because there are two separate global transfer lines 98 and 100, the arrangement of FIG. 8 allows two separate transfer operations in which accumulated charge in pixels 18 are transferred to storage elements in the pixels 18 (e.g., diffusion nodes in the pixels 18) to occur. With one arrangement, the first transfer operation may occur when GRD1 signals are asserted on line 98 and the accumulated charges of the pixels 18 associated with the first exposure (T1) are transferred to storage elements in the pixels 18. The second transfer operation may occur when GRD2 signals are asserted on line 100 and the accumulated charges of the pixels 18 associated with the second exposure (T2) are transferred to storage elements in the pixels 18. The two transfer operations may occur independently in time.

Figure 9:
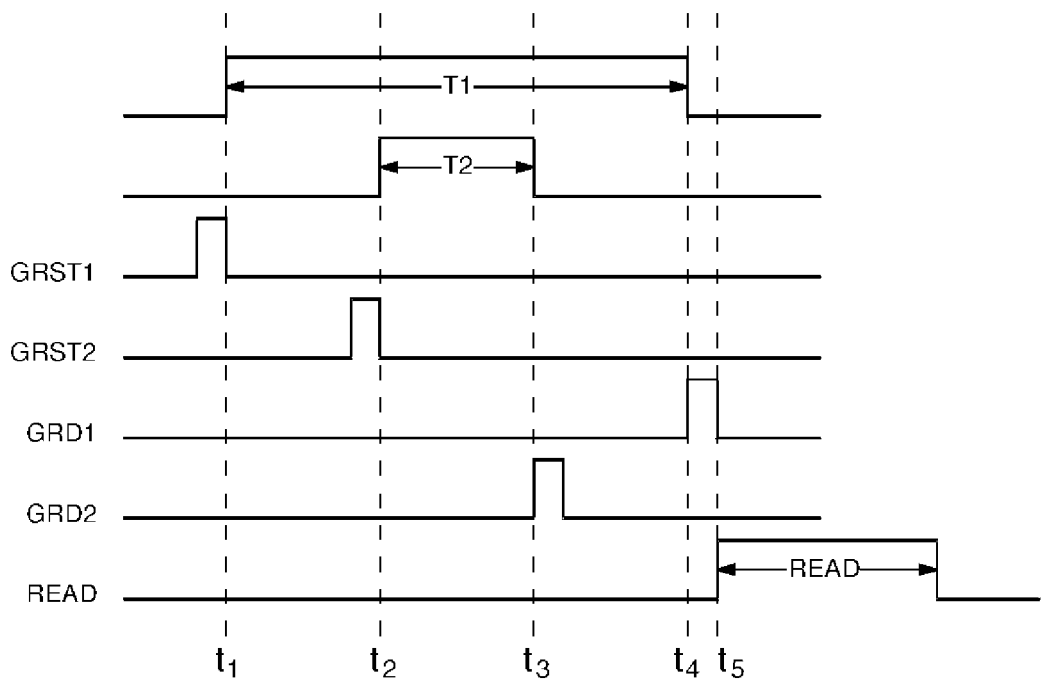
FIG. 9 is a graph that illustrates how the pair of global reset lines and the pair of global transfer lines of FIG. 8 may be used to independently control two separate exposures in the array of pixels in accordance with an embodiment of the present invention.

Because there are two global reset lines and two global transfer lines, the arrangement of FIG. 8 allows a high degree of flexibility in selecting how the first and second exposures of array 14 (i.e., T1 and T2) overlap in time. For example, as shown in FIG. 9, the pixels 18 of the first exposure T1 may be reset by GRST1 signals on line 94 at time t1 (which effectively initiates the T1 exposure at time t1), the pixels 18 of the second exposure T2 may be reset by GRST2 signals on line 96 at time t2 (which effectively initiates the T2 exposure at time t2), transfer signals GRD2 may be asserted at time t3 (effectively ending the T2 exposure), transfer signals GRD1 may be asserted at time t4 (effectively ending the T1 exposure), and readout signals READ may begin to be asserted at time t5 to begin reading out image data from array 14. Because of the flexibility available in this arrangement, the second exposure may occur in the middle (time-wise) of the first exposure or may occur at any other time. With one arrangement, the relative timing of the first and second exposures may be selected to optimize output image quality.

Figure 10:
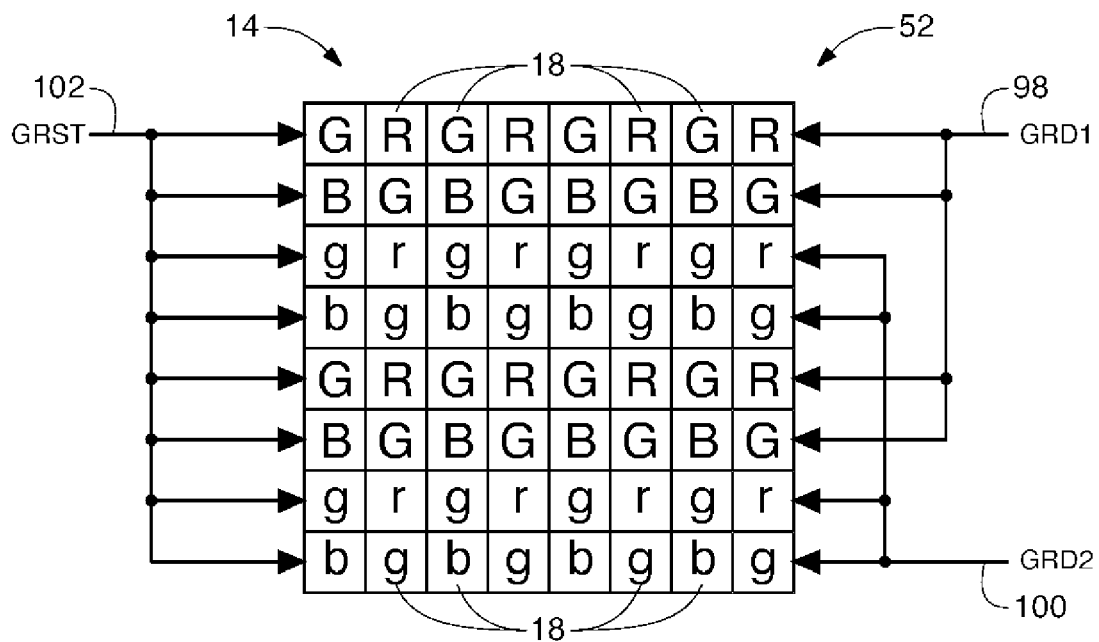
FIG. 10 is a diagram of the illustrative color filter array and the array of pixels of FIG. 4 that shows how a global reset line and a pair of global transfer lines may be used in implementing a global shutter readout of the array of pixels in accordance with an embodiment of the present invention.
Figure 11:
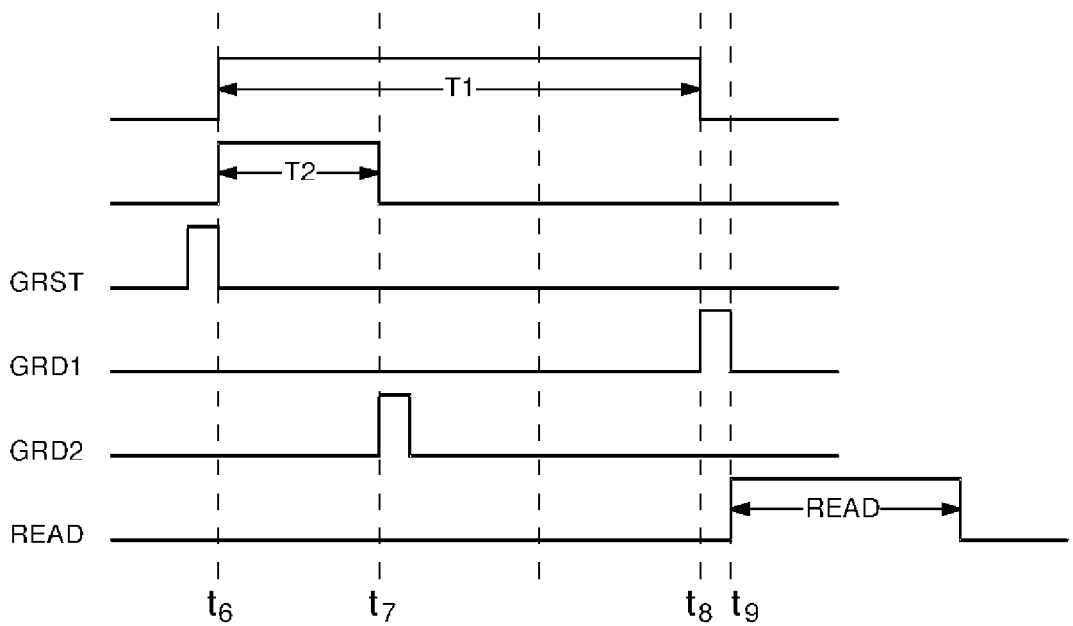
FIG. 11 is a graph that illustrates how the global reset line of FIG. 10 may be used to initiate two separate exposures in the array of pixels at a single time and how the pair of global transfer lines may be used to terminate the two exposures at different times in accordance with an embodiment of the present invention.
Figure 12:
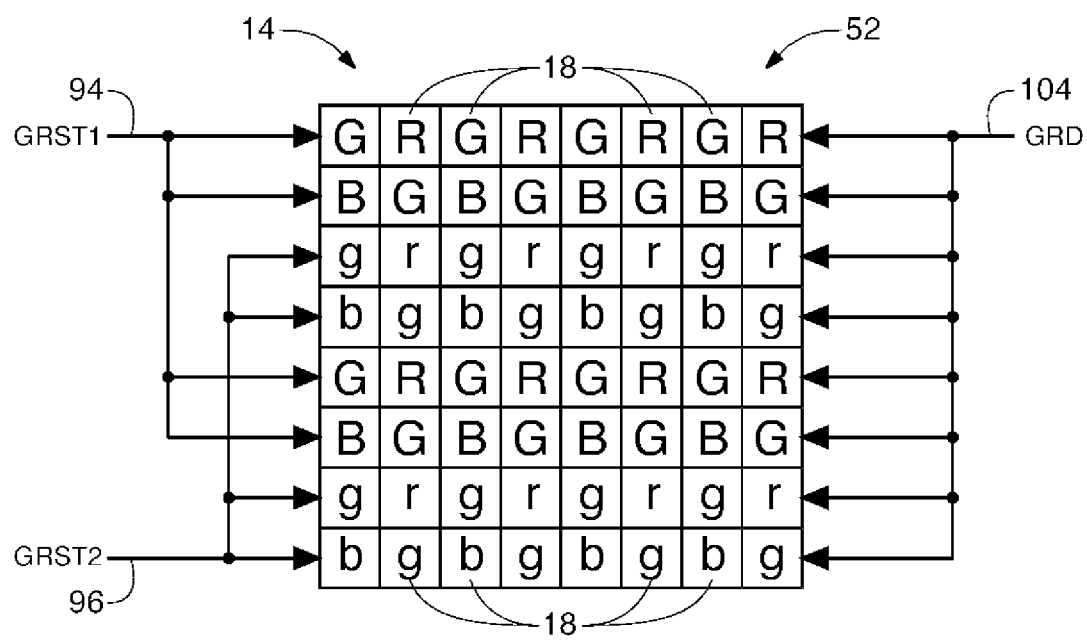
FIG. 12 is a diagram of the illustrative color filter array and the array of pixels of FIG. 4 that shows how a pair of global reset lines and a global transfer line may be used in implementing a global shutter readout of the array of pixels in accordance with an embodiment of the present invention.
Figure 13:
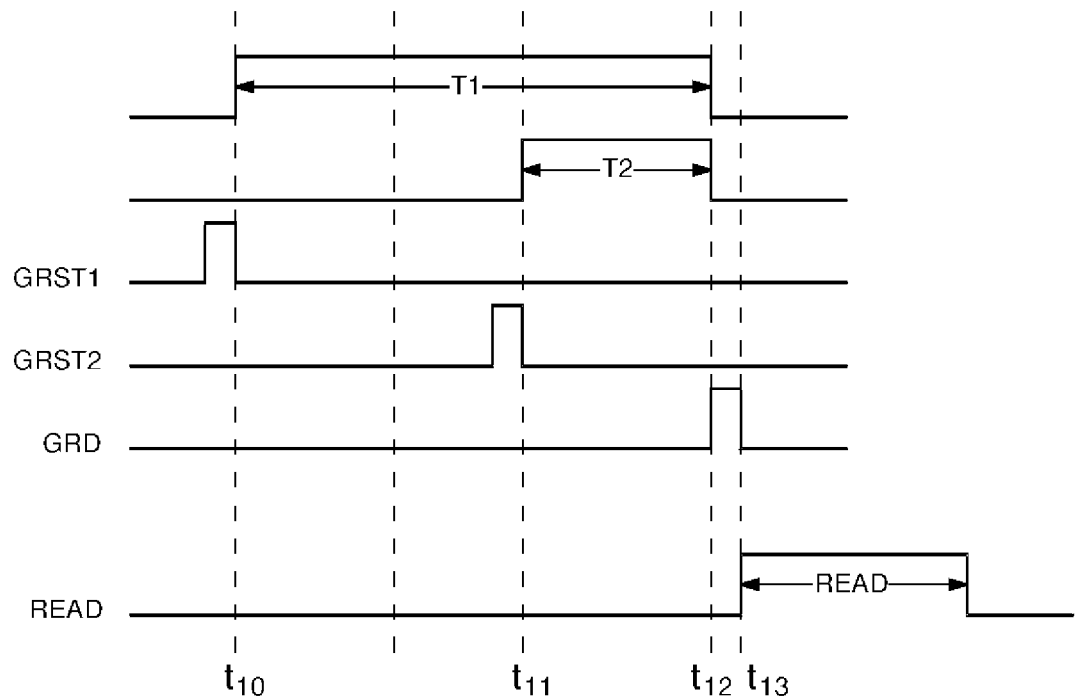
FIG. 13 is a graph that illustrates how the pair of global reset lines may be used to initiate two separate exposures in the array of images sensors at different times and how the global transfer line may be used to terminate the two exposures at a single time in accordance with an embodiment of the present invention.

If desired, device 10 may implement a global shutter scheme for array 14 using a single global reset line (as shown in FIGS. 10 and 11) or a single global transfer line (as shown in FIGS. 12 and 13). While the arrangements that include only a single global reset line or a single global transfer line may not afford the same level of flexibility as the arrangement of FIGS. 8 and 9, these arrangements may exhibit reduced complexity and cost.

FIG. 10 illustrates how a single global reset line 102 may be used in conjunction with a pair of global transfer lines 98 and 100 to implement a global shutter control scheme in array 14. Global reset line 102 may convey global reset signals such as GRST to array 14. Because there is only a single global reset line 102, the arrangement of FIG. 10 initiates the first and second exposures of pixels 18 (e.g., exposures T1 and T2) simultaneously. The first and second exposures may be initiated when the GRST signals are asserted on line 102 and the pixels 18 of array 14 are reset. As one example, the first and second exposures may be terminated independently in time by transfer signals on global transfer lines 98 and 100, respectively.

As shown in FIG. 11, the pixels 18 of the first exposure T1 and the second exposure T2 may be reset by GRST signals on line 102 at time t6, transfer signals GRD2 may be asserted at time t7 (terminating the T2 exposure), transfer signals GRD1 may be asserted at time t8 (terminating the T1 exposure), and readout signals READ may be asserted at time t9 to begin reading out image data from array 14. Because there is only a single global reset line, the first and second exposures may begin simultaneously.

FIG. 12 illustrates how a single global transfer line 104 may be used in conjunction with a pair of global reset lines 94 and 96 to implement a global shutter scheme in array 14. Global transfer line 104 may convey global transfer signals such as GRD to array 14. Because there is only a single global transfer line 104, the arrangement of FIG. 12 terminates the first and second exposures of pixels 18 (e.g., transfers the accumulated charges of the pixels performing the T1 exposure and the pixels performing the T2 exposure) simultaneously. The first and second exposures may be initiated independently by the global reset lines 94 and 96, respectively.

As shown in FIG. 13, the pixels 18 of the first exposure T1 may be reset by GRST1 signals at time t10, the pixels 18 of the second exposure T2 may be reset by GRST2 signals at time t11, global transfer signal GRD may be asserted at time t12 (terminating the T1 and T2 exposures), and readout signals READ may be asserted at time t13 to begin reading out image data from array 14. Because there is only a single global transfer line, the first and second exposures may be timed to end simultaneously.

Once image sensor array 14 has been used to capture image data associated with a scene that has a high dynamic range (e.g., a range that exceeds a linear response of a single image sensing pixel such as pixel 18), the image data may be used to produce a high dynamic range image. The high dynamic range image may be stored in storage and processing circuitry 17 and, if desired, may be conveyed over a communications path to external computing equipment by communications circuitry in device 10. In one embodiment, the image data produced by sensor array 14 may include two or more interlaced images interleaved together. As an example, the first image may include all of the even row pairs of sensor array 14 and may be captured using a first exposure (T1) and the second image may include all of the odd row pairs of array 14 and may be captured using a second exposure (T2).

If desired, a de-interlacing algorithm may be applied to each of the images produced by sensor array 14. With this type of arrangement, the image data from sensor array 14 can be used to produce two full resolution images each of which corresponds to a different exposure time (when capturing high dynamic range images). The de-interlaced images can then be combined into a high dynamic range image. This type of arrangement is shown in the example of FIG. 14.

Figure 14A:
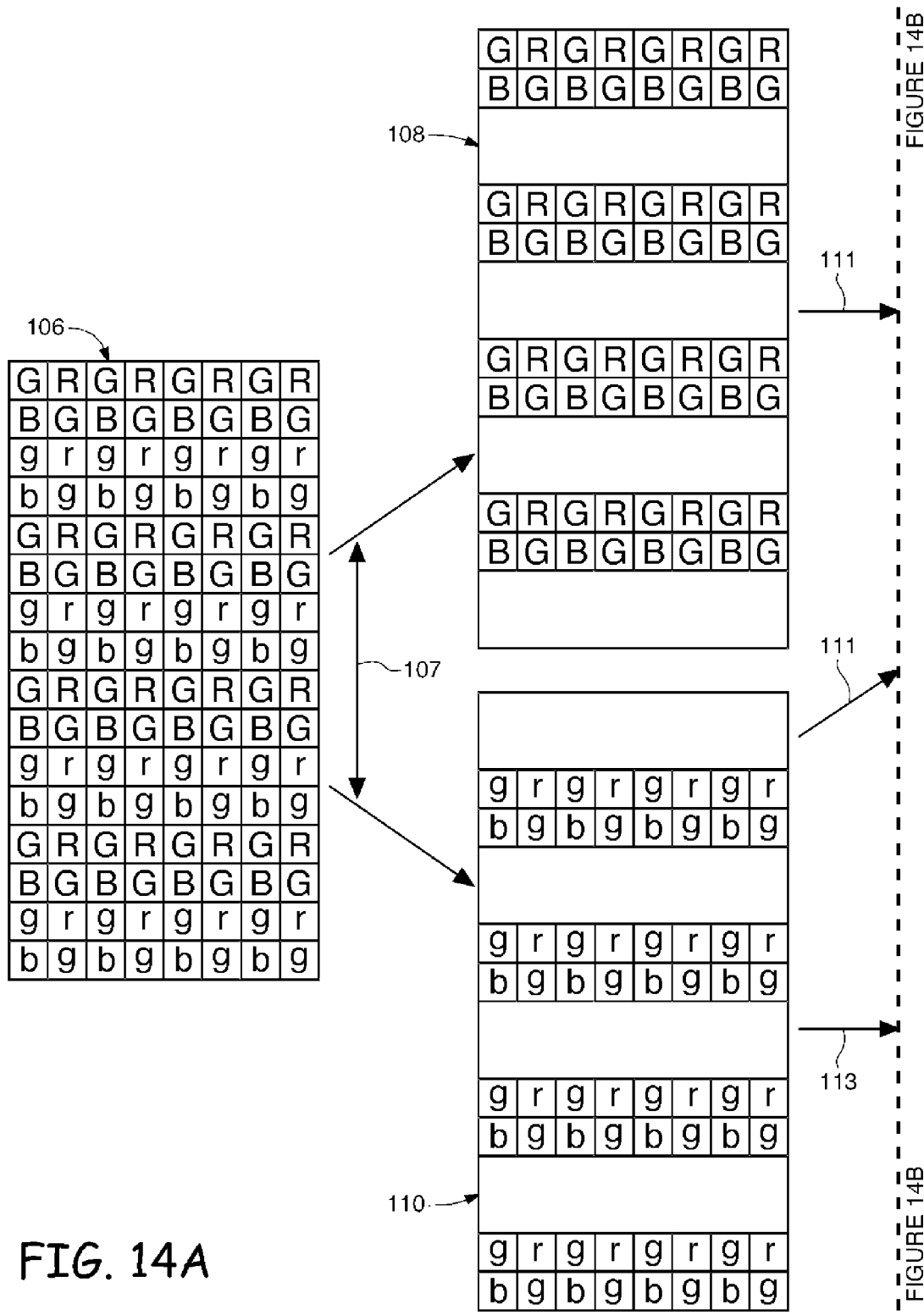
FIG. 14 is a diagram of illustrative steps involved in reconstructing a high dynamic range image using image data from an array of pixels such as the array of FIG. 4 in accordance with an embodiment of the present invention.
Figure 14B:
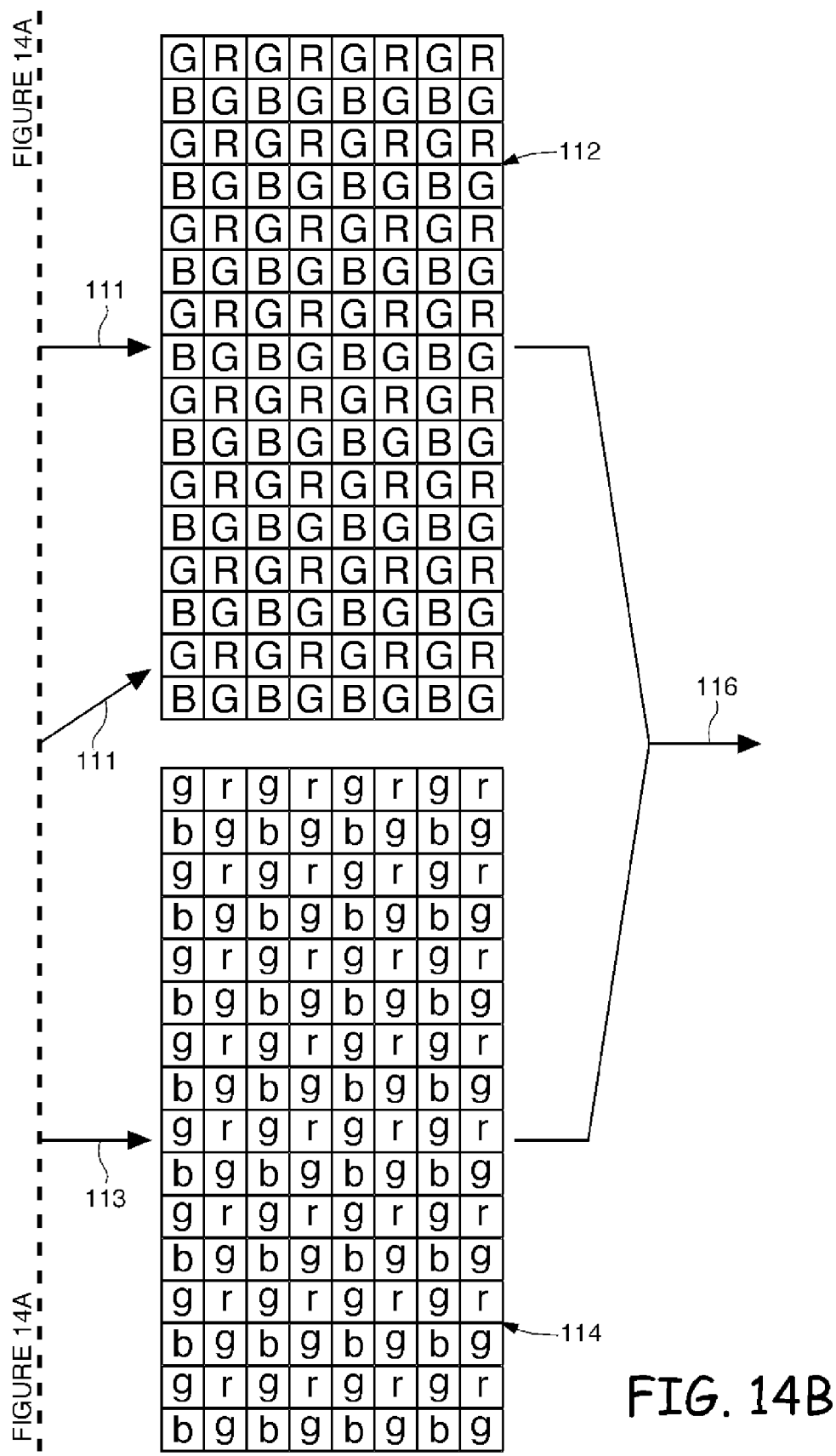

As shown in FIG. 14, image data 106 produced by sensor array 14 may include two interlaced images that are interleaved together. The image data 106 may be split into a first interlaced image 108 and a second interlaced image 110 (e.g., as illustrated by step 107). The first interlaced image 108 may correspond to image data captured by the pairs 52 of pixels 18 (e.g., the pixels 18 used to capture a first exposure of time T1) and the second interlaced image 110 may correspond to image data captured by the pairs 56 of pixels 18 (e.g., the pixels 18 used to capture a second exposure of time T2).

The first interlaced image 108 may be de-interlaced using an interpolation process 111 to produce image data 112 (e.g., a full resolution image corresponding to the first exposure T1) and the second interlaced image 110 may be de-interlaced using an interpolation process 113 to produce image data 114 (e.g., a full resolution image corresponding to the second exposure T2). With one arrangement, the first interlaced image 108 may be de-interlaced using an interpolation process 111 that uses image data from both the first and second interlaced images 108 and 110.

The first and second de-interlaced images 112 and 114 can be combined into a single high dynamic range image using combination process 116 (e.g., an exposure combination algorithm that combines the first and second exposures into a high dynamic range image).

The processes of FIG. 14 may be performed using a combination of hardware, software running on storage and processing circuitry 17, and image processing circuitry 38 (as examples). If desired, the processes of FIG. 14 may be performed after both exposures (T1 and T2) are read out from array 14 (and stored in memory such as frame buffers). With another arrangement, the processes of FIG. 14 may be performed as the exposures (T1 and T2) are read out from array 14 (e.g., using line buffers 36 and without requiring that the entirety of the image data be read out from array 14 before image processing operations begin). This type of arrangement may be help to reduce the amount of memory required to perform the desired image processing operations.

Figure 15:
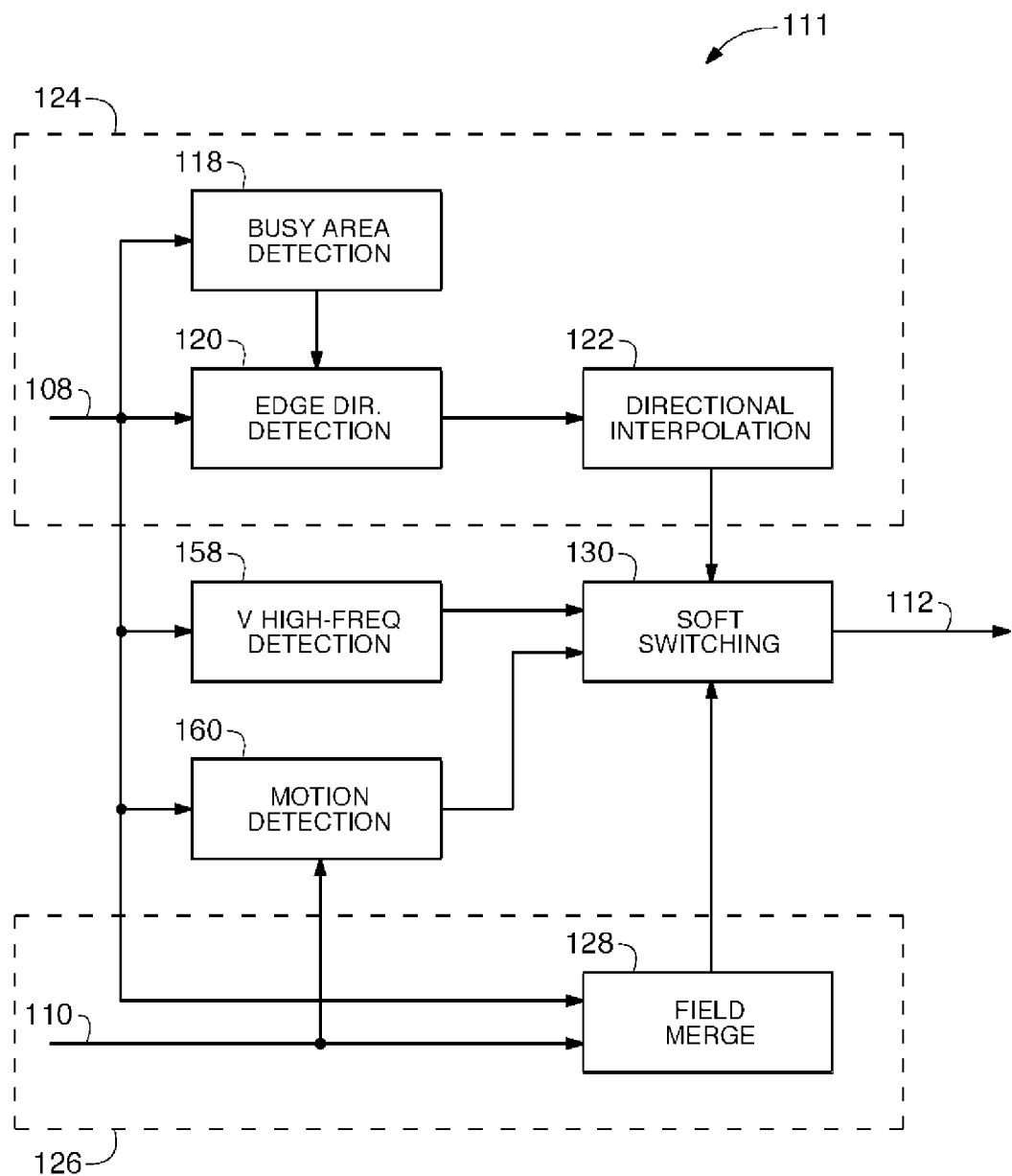
FIG. 15 is a block diagram of an illustrative de-interlacing process that may be used to de-interlace long exposure time image data from an array of pixels and that may also utilize short exposure time image data from the array of pixels in accordance with an embodiment of the present invention.

A block diagram of a de-interlacing process 111 that may be used to produce a de-interlaced version of the first exposure T1 is shown in FIG. 15. In one embodiment, image data 110 (e.g., image data from a relatively short exposure used in forming a high dynamic range image) may be used in conjunction with the image data 108 in process 111 (e.g., because the two images include image information from a common scene).

As part of de-interlacing image data 108, image processing circuitry such as circuitry 38 of FIG. 1 in device 10 may utilize an interpolation algorithm that detects the direction of edges in the image data 108 and then interpolates missing image data along the detected direction of the edges. As one example, circuitry 38 may utilize an edge direction detection process 120 that detects the directions of edges in image data 108 and may use a busy area detection process that detects busy areas of the image data 108. With one arrangement, circuitry 38 may disable edge direction detection 120 in areas of the image data 108 that do not have relatively clean or sharp edges as determined by busy area detection process 120. The directional interpolation process 122 may then be used to interpolate missing image data by taking the average of two or more pixels along the detected edge direction or, if the missing image data is in a busy area of image 108, by taking the average along a standard direction such as the vertical direction. Busy area detection process 118, edge direction detection process 120, and directional interpolation process 122 may be a part of an intra-field interpolation process 124 (e.g., a spatial interpolation process that only uses image data 108 as an input).

Figure 16:
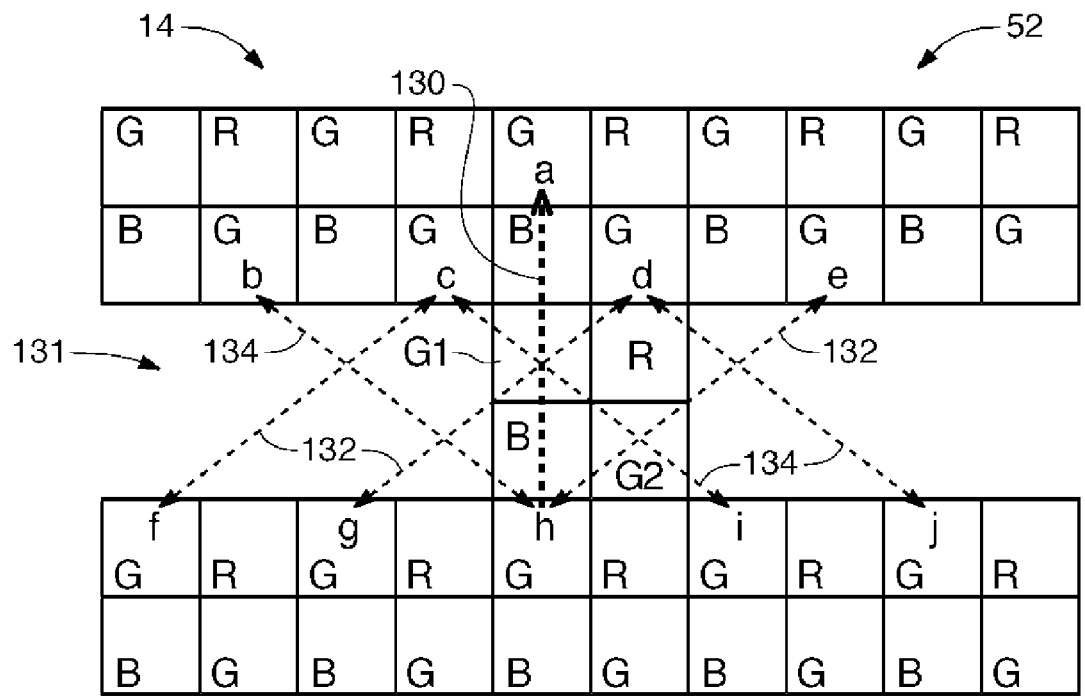
FIG. 16 is a diagram of an illustrative image sensor array that illustrates one potential way in which an image processing operation can detect edges in an image as part of a de-interlacing operation in accordance with an embodiment of the present invention.

FIG. 16 illustrates one potential way in which edge direction detection process 120 may be performed. The example of FIG. 16 illustrates the operation of edge direction process 120 for a missing row pair of array 14 (e.g., missing row pair 131). Specifically, FIG. 16 illustrates the interpolation of four pixels in row pair 131 (e.g., the G1, R, B, and G2 pixels). The interpolation process 111 may use the same edge direction detected by process 120 for each of these four pixels (e.g., the edge direction for pixel G1 may also be used for pixels R, B, and G2). As an example, edge detection process 120 may include computing a vertical direction difference (d[0]) by taking the difference of the two pixels a and h of FIG. 16 (e.g., the two pixels 18 indicated by line 130) and multiplying it by 3 (e.g., a weighting factor) as shown in equation 1.

$$d[0]=3*|a-h|. \quad (1)$$

Edge detection process 120 may also include computing first and second diagonal directional differences (d[1] and d[2]) by taking the sum of the three diagonal differences of the corresponding pixels indicated by lines 132 (e.g., pixels c, d, e, f, g, and h) and by taking the sum of the three differences of the corresponding pixels indicated by lines 134 (e.g., pixels b, c, d, h, i, and j) as shown in equations 2 and 3, respectively.

$$d[1]=|c-f|+|d-g|+|e-h| \quad (2)$$

$$d[2]=|b-h|+|c-i|+|d-j| \quad (3)$$

Edge direction detection 120 may then determine the edge direction by determining the index of d[k] that gives the smallest value (e.g., determining whether d[0], d[1], or d[2] has the lowest value).

Busy area detection process 118 may include applying a high pass filter [−1, 2, −1] on the green pixels on the row above missing row pair 131 (e.g., green pixels b, c, d, and e) and by taking the absolute value of the result. The high pass filter may be used in determining to what extent the value of a particular green pixel exceeds the average of the two neighboring green pixels in the same row (e.g., if the value of pixel c is greater than the average of pixels b and d). If result of the high pass filter applied to a particular pixel such as pixel c exceeds a threshold value (e.g., at least equal to a value of 180) it may be marked as a peak pixel. The busy area detection process 118 may then count the number of peak pixels within an interval of a particular pixel at coordinates (x,y) (e.g., within a distance of seven pixels from x and three pixels from y). If the number of peak pixels exceeds a threshold value such as 3 (e.g., roughly 50% of the total green pixels within a distance of seven pixels horizontally and three pixels vertically), then pixel (x,y) may be considered to be within a busy area. If busy area detection process 118 determines that a particular pixel (x,y) is busy, the value of dir[0] may be set to 0 (e.g., the edge direction detection 120 may be disabled such that the direction interpolation process 122 interpolates pixels along a vertical direction).

Figure 17:
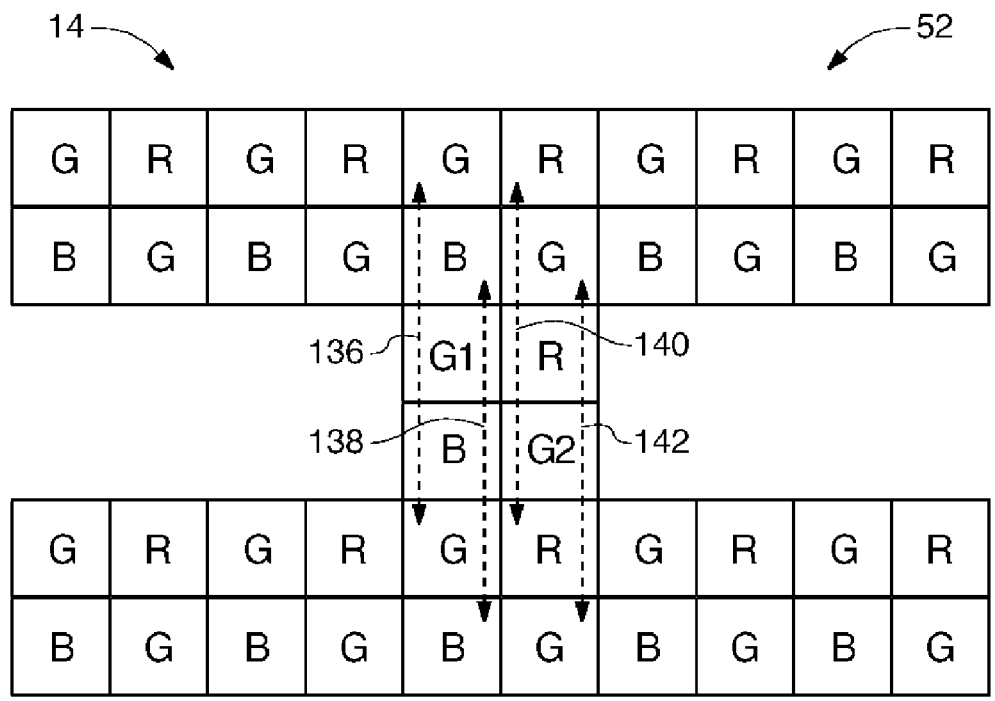
FIG. 17 is a diagram of the illustrative image sensor array of FIG. 16 showing how an interpolation operation may fill in pixel information when a vertical edge is detected in an image or when a busy area of the image is detected in accordance with an embodiment of the present invention.
Figure 18:
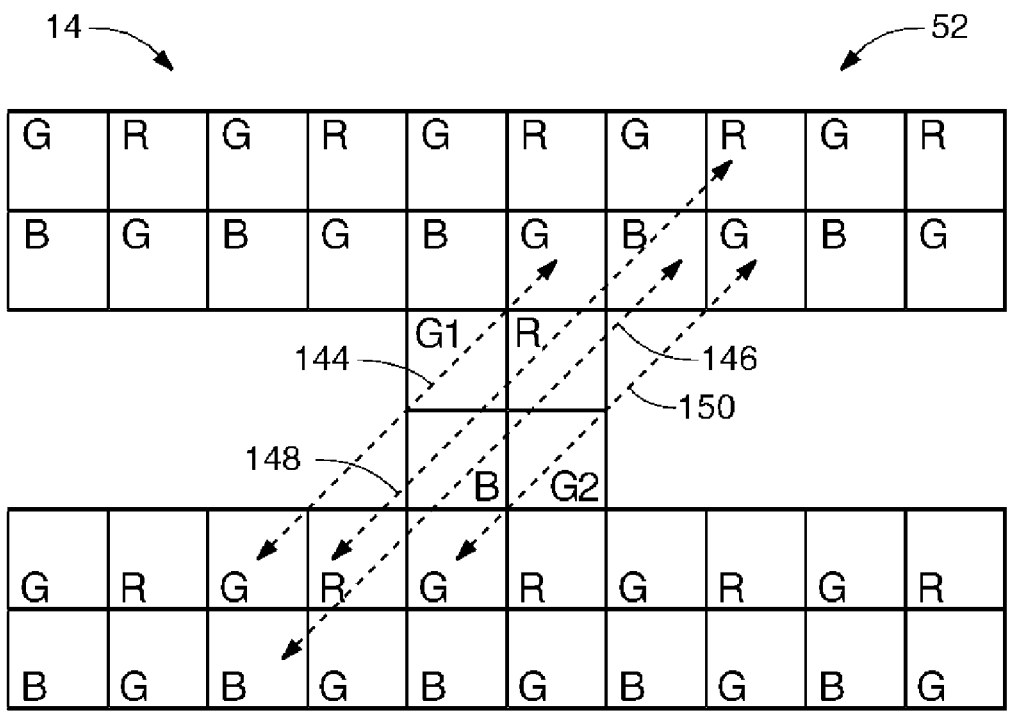
FIG. 18 is a diagram of the illustrative image sensor array of FIG. 16 showing how an interpolation operation may fill in pixel information when an edge in an image that traverses
Figure 19:
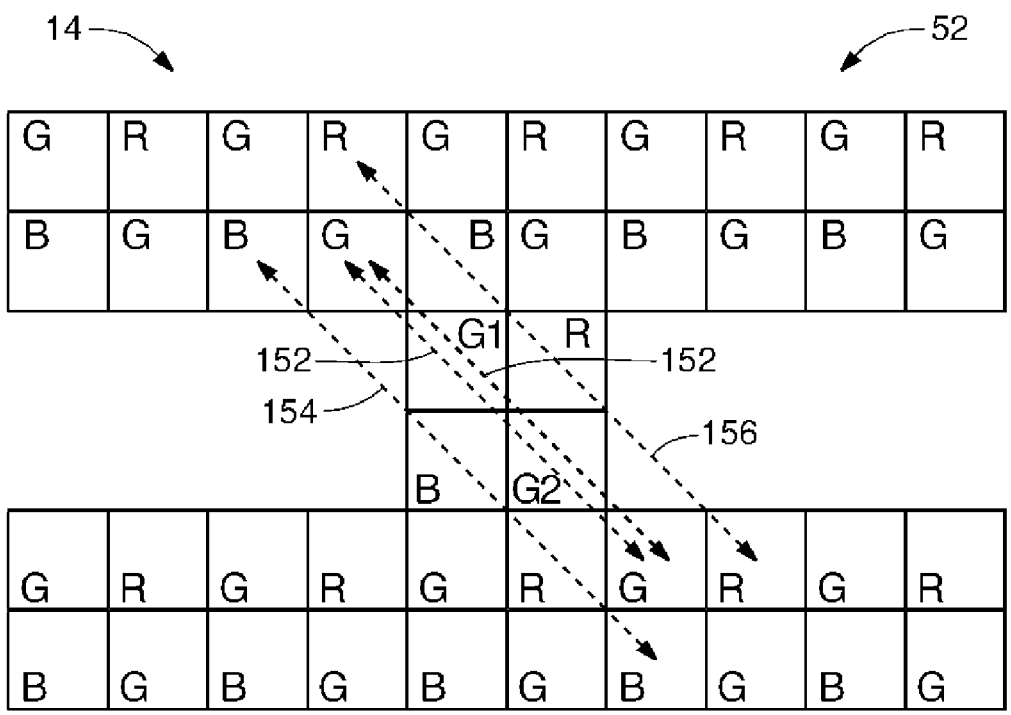
FIG. 19 is a diagram of the illustrative image sensor array of FIG. 16 showing how an interpolation operation may fill in pixel information when an edge in an image that traverses from a lower-right direction to an upper-left direction is detected in accordance with an embodiment of the present invention.

With one arrangement, direction interpolation process 122 may interpolate the missing pixels G1, R, B, and G2 by taking the averages of the corresponding two pixels along the detected edge direction. For example, if the detected edge direction is d[0] (e.g., vertical) or if the busy area detection process 118 detects a busy area, the values of missing pixels G1, R, B, and G2 may be calculated by averaging the two green pixels indicated by line 136, the two red pixels indicated by line 140, the two blue pixels indicated by line 138, and the two green pixels indicated by line 142, respectively (as illustrated in FIG. 17). If the detected edge direction is d[1] (e.g., from the lower-left to the upper-right, or vice-versa, of array 14), the values of missing pixels G1, R, B, and G2 may be calculated by averaging the two green pixels indicated by line 144, the two red pixels indicated by line 148, the two blue pixels indicated by line 146, and the two green pixels indicated by line 150, respectively (as illustrated in FIG. 18). If the detected edge direction is d[2] (e.g., from the upper-left to the lower-right, or vice-versa, of array 14), the values of missing pixels G1, R, B, and G2 may be calculated by averaging the two green pixels indicated by line 152, the two red pixels indicated by line 156, the two blue pixels indicated by line 154, and the two green pixels indicated by line 152, respectively (as illustrated in FIG. 19). (In the example of FIG. 19, the two green pixels indicated by line 152 may be used to interpolate the values for both the G1 and G2 pixels.)

Circuitry 38 may also perform an inter-field interpolation process 126, as illustrated in FIG. 15) that uses image data 108 and image data 110 as inputs. Process 126 may include field merge process 128. In the field merge process 128, the interlaced images 108 and 110 are combined. With one arrangement, image 108 is directed added to output of process 128 and image 108 is added after being multiplied by an appropriate exposure ratio. The exposure ratio may be, for example, the ratio of the time duration of the first exposure divided by the time duration of the second exposure (i.e., T1/T2). Field merge process 128 may calculate the value of each pixel in a merged field using equations 4 and 5 (as examples).

$$F1\_mg(x,y)=F1(x,y) \quad (4)$$

$$F1\_mg(x,y)=\exp\_ratio*F2(x,y) \quad (5)$$

In equations 4 and 5, F1_mg may be the merged field output by process 128 and the coordinates (x,y) may denote the row and column of a particular pixel in array 14. F1 may represent the image data 108 and F2 may represent the image data 110. Process 128 may use equation 4 if the coordinate (x,y) is in the image data 108 (e.g., the coordinate (x,y) lies in one of the row pairs represented by image data 108) and may use equation 5 if the coordinate is in the image data 108 (e.g., the coordinate (x,y) lies in one of the row pairs represented by image data 110). The exposure ratio (i.e., the ratio of the exposure times between image data 108 and 110) may be represented by "exp_ratio" in equation 5. With one arrangement, multiplying the image data 110 (F2) by the exposure ratio "exp_ratio" may be referred to as normalizing the image data 110 (i.e., the second exposure) to the image data 108 (i.e., the first exposure).

The interpolated version of image 108 created in process 124 and the merged version of images 108 and 110 created in process 126 may then be used to create the final version of the de-interlaced first exposure image that is produced at output 112. With one arrangement, circuitry 32 may use a soft switching process 130 controlled by a vertical high frequency detection process 158 and a motion detection process 160. Motion detection process 160 may detect differences in image data 108 and image data 110 indicative of motion between the image data 108 and the image data 110.

Vertical frequency detection process 158 may be used in controlling the switching between the output of spatial de-interlacing process 124 and the field merge process 126. Vertical frequency detection process 158 may detect the frequency of vertical features in the image data. Vertical high frequency detection process 158 may be done using a group of four pixels (e.g., the G1, R, B, and G2 pixels of FIG. 16). The group of pixels may share the same detection result for vertical high frequency. With one arrangement, the vertical frequency may be computed using equations 6 and 7.

$$avg=(G1+R+B+G2)/4 \quad (6)$$

$$V(x,y)=|2*\exp\_ratio*avg\_middle-avg\_top-avg\_bottom|/4 \quad (7)$$

In equation 7, avg_top and avg_bottom may use pixel values from image data 108 and avg_middle may use corresponding pixel values from image data 110. Vertical frequency detection process 158 may then define a high frequency detection function, which may be used in soft switching function 130 to switch between de-interlacing processes 124 and 126, using equation 8.

$$\alpha(x,y)=\min(t2-t1,\max(0,V(x,y)-t1))/(t2-t1) \quad (8)$$

In equation 8, t1 and t2 may be adjustable parameters. With one arrangement, t1 may have a value of 4 and t2 may have a value of t1+16 (i.e., 20). The function α(x,y) may be a continuous non-decreasing function that ranges from 0 and 1. A value for α(x,y) near 0 indicates a vertical low frequency area (e.g., relatively smooth vertical features) and a value near 1 indicate a vertical high frequency area (e.g., rapidly changing vertical features in the image data). With one arrangement, vertical frequency detection process 158 may direct soft switching function 130 to use the output of spatial interpolation process 124 (e.g., function 130 may use image data 108 exclusively) when an area of relatively low vertical frequency is detected (e.g., when the frequency of vertical features is below a given threshold value). In contrast, in areas of relatively high vertical frequency (e.g., when the frequency of vertical features exceeds a given threshold value), process 158 may direct function 130 to use the output of field merge process 126 (e.g., function 130 may use image data 108 and 110 together).

When motion occurs in an image between the first and second exposures T1 and T2, field merge process 128 may create interlacing artifacts. With one arrangement, motion detection process 160 may be used to detect this type of motion and direct soft switching process 130 to switch to spatial de-interlacing process 124. Motion detection process 160 may be done for a group of four pixels such as G1, R, B, and G2 of FIG. 16 which may each share the same motion detection result. The motion of the four pixels may be calculated using equation 9.

$$M(x,y)=|avg\_top-\exp\_ratio*avg\_middle|+|avg\_bottom-\exp\_ratio*avg\_middle|-|avg\_top-avg\_bottom| \quad (9)$$

With one arrangement, motion detection process 160 may use the results of equation 9 (i.e., the function M(x,y)) to define a motion detection function, which may be used in soft switching function 130 to switch between de-interlacing processes 124 and 126, using equation 10.

$$\beta(x,y) = \min(s2-s1, \max(0, M(x,y)-s1))/(s2-s1) \tag{10}$$

In equation 10, s1 and s2 may be adjustable parameters that have appropriate values. The function $\beta(x,y)$ may be a continuous non-decreasing function that ranges from 0 and 1. A value for $\beta(x,y)$ near 0 may indicate relatively little motion is occurring in the region around pixel (x,y) and a value near 1 may indicate that the pixel includes motion. If desired, if the detected motion for a portion of the image is above a given threshold, soft switching function 130 may use image data 108 exclusively and, if the detected motion is below the given threshold, soft switching function 130 may image data 108 in conjunction with image data 110.

Soft switching function 130 be used to create the de-interlaced version of the first exposure (e.g., output 112) from outputs of the de-interlacing processes 124 and 126 according to inputs from processes 158 and 160. With one arrangement, the output of function 130 (e.g., output 112) may be calculated using equation 11.

$$F1\_de(x,y) = (1-\alpha(x,y))*F1\_sp + \alpha(x,y)*((1-\beta(x,y))*F1\_mg + \beta(x,y)*F1\_sp) \tag{11}$$

In equation 11, F1_de may represent the de-interlaced version of image data 108 output on line 112, F1_sp may represent the de-interlaced image produced by the spatial de-interlacing process 124, and F1_mg may represent the de-interlaced image produced by the field merge de-interlacing process 126.

Figure 20:
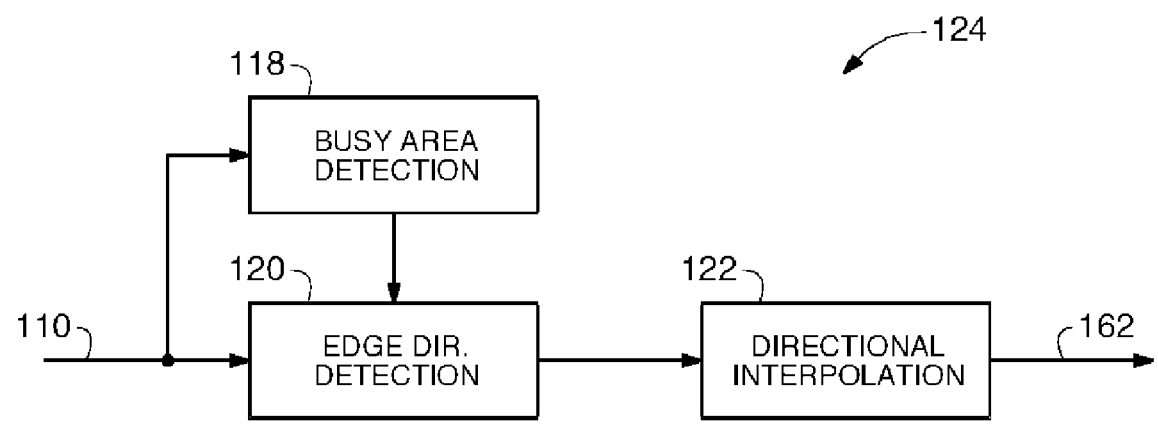
FIG. 20 is a block diagram of an illustrative de-interlacing processes that may be used to de-interlace short exposure time image data from an array of pixels in accordance with an embodiment of the present invention.

Image data 110 may be de-interlaced using the spatial de-interlacing process 124 to create a de-interlaced version of image data 110 on output line 162 as shown in FIG. 20. For example, image data 110 may be de-interlaced using the busy area detection process 118, the edge direction detection process 120, and the directional interpolation process 122 described in connection with FIGS. 15, 16, 17, 18, and 19. This is merely one example of how image data 110 (e.g., the second exposure captured by array 14 of FIG. 2) may be de-interlaced.

Figure 21:
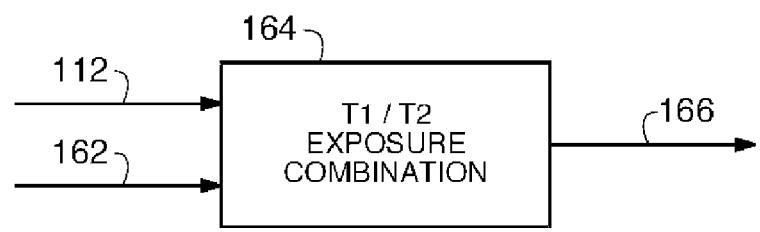
FIG. 21 is a block diagram of an illustrative exposure combination process that may be used to combine short exposure time image data and long exposure time image data from an array of pixels to create a high dynamic range image in accordance with an embodiment of the present invention.

The de-interlaced versions of the first and second exposures captured by array 14 (e.g., the de-interlaced version of image data 108 and 110) may be combined, as illustrated in FIG. 21, into a high dynamic range image using T1/T2 exposure combination function 164. Exposure combination function 164 may calculate the high dynamic range image output 166 using equations 12, 13, 14, 15, 16, and 17.

$$\theta(x,y) = \min(E2-E1, \max(0, F1\_tilde(x,y)-E1))/(E2-E1) \tag{12}$$

$$F\_hdr(x,y) = (1-\theta(x,y))*F1\_tilde(x,y) + \theta(x,y)*(\exp\_ratio*F2\_tilde(x,y)) \tag{13}$$

$$F1\_tilde(x,y) = F1(x,y) (\text{if } (x,y) \text{ is in } F1) \tag{14}$$

$$F1\_tilde(x,y) = F1\_de(x,y) (\text{if } (x,y) \text{ is in } F2) \tag{15}$$

$$F2\_tilde(x,y) = F2(x,y) (\text{if } (x,y) \text{ is in } F2) \tag{16}$$

$$F2\_tilde(x,y) = F2\_de(x,y) (\text{if } (x,y) \text{ is in } F1) \tag{17}$$

In equations 12, 13, 14, 15, 16, and 17, F1 and F2 may represent image data 108 and 110, respectively. F1_de and F2_de may represent de-interlaced image data 112 and 162, respectively. E1 and E2 of equation 12 may be adjustable parameters that have appropriate values. F_hrd(x,y) may be the final high dynamic range image produced by array 14 and image processing circuitry 38 in device 10. The clauses that require (x,y) to be in F1 or in F2 may be satisfied when the de-interlaced image data from array 14 from either the first or second exposure, respectively, includes image data for the image sensor (pixel) at the (x,y) coordinates. For example, the first exposure data may include image data for the pixels in the odd row pairs of array 14 (e.g., rows 0, 1, 4, 5, 8, 9, etc.) and the second exposure data may include may include image data for the pixels in the even row pairs of array 14 (e.g., rows 2, 3, 6, 7, 10, 11, etc.).

Various embodiments have been described illustrating arrays of pixels and image reconstruction methods that capture high dynamic range images. The arrays of pixels may be used in any electronic device.

A high dynamic range image sensor array may be used to capture scenes with light ranges that exceed the dynamic range of individual pixels in the array. In one embodiment, the high dynamic range image sensor array may include two or more interleaved image sensor arrays each of which can be used to capture an image of a scene using a different exposure time. As an example, the high dynamic range image sensor may include a first image sensor array formed from the pixels in the odd row pairs (e.g., rows 0, 1, 4, 5, 8, 9, etc.) and a second image sensor array formed from the pixels in the even row pairs (e.g., rows 2, 3, 6, 7, 10, 11, etc.) of the high dynamic range image sensor. In another embodiment, the high dynamic range image sensor may include first and second image sensor arrays arranged in alternating rows (e.g., a first array in rows 0, 2, 4, 6, etc. and a second array in rows 1, 3, 5, 7, etc.).

The high dynamic range image sensor may include any color filter array. For example, the high dynamic range image sensor may include a color filter that uses the Bayer pattern. In another embodiment, the high dynamic range image sensor may include a non-Bayer color filter such as a color filter pattern that includes primary colors (e.g., red, blue, and green) on each of the rows of the color filter.

If desired, the high dynamic range image sensor array may be implemented using an electronic rolling shutter readout or a global shutter readout (as examples). With an electronic rolling shutter readout, a pair of row address pointers for pixel reset (i.e., image sensor reset) may be used in conjunction with a row address pointer for pixel readout to capture a high dynamic range image. With this type of arrangement, the first row address reset pointer can progress through the image sensor array to reset the pixels associated with a first exposure (e.g., the pixels in the odd row pairs of the image sensor array) and can be followed by the second row address pointer (after an appropriate delay) that resets the pixels associated with a second exposure. Subsequently, the row address readout pointer can progress through the image sensor array to readout accumulated charges from all of the pixels in the high dynamic range image sensor array. The first exposure may be a relatively long exposure that captures dark elements in a high dynamic range scene (e.g., captures enough light to overcome noise in the array) while the second exposure may be a relatively short exposure that captures bright elements in the scene (e.g., an exposure that ends before the bright elements saturate the pixels in the array).

With a global shutter readout, the high dynamic range image sensor array may include, as examples, a pair of global reset lines and a pair of global transfer lines, a single global reset line and a pair of global transfer lines, or a pair of global reset lines and a single global transfer line. When the image sensor array includes a pair of global reset lines, the first global reset line may be used to reset all of the pixels associated with the first exposure simultaneously and the second global reset line may be used to reset all of the pixels associated with the second exposure simultaneously. Similarly, when the image sensor array includes a pair of global transfer lines, the first and second global transfer lines may be used to terminate the first and second exposures, respectively, by directing all of the pixels in the respective exposure to transfer their accumulated charges to storage elements in the pixels. With this type of arrangement, the first and second exposures can be initiated (in the reset operation) and terminated (in the transfer operation) independently. When only a single global transfer line or a single global reset line is used, the first and second exposures will either be initiated at the same time (with a single global reset line) or will be terminated at the same time (with a single global transfer line).

The image data obtained from the high dynamic range image sensor array may include at least two interlaced images interleaved together (e.g., a first image from the first long exposure and a second image from the second short exposure). Image processing circuitry in an electronic device that includes the image sensor array or another electronic device may perform image processing operations on the two images to de-interlace the two images and combine the images into a high dynamic range image.

In one embodiment, the image processing circuitry may de-interlaced the first image (i.e., the image obtained in the first long exposure) using both the first image and the second image. As one example, the image processing circuitry may create a de-interlaced version of the first image using a spatial de-interlacing process that includes edge direction detection, busy area detection, and directional interpolation processes applied to the first image and may create a de-interlaced version of the first image by merging the first image with the second image (the second image may be scaled by an exposure ratio factor). The image processing circuitry may then use information from a vertical high frequency detection process and a motion detection process to switch between the two de-interlaced versions of the first image to create a final de-interlaced version of the first image. The image processing circuitry may de-interlace the second image using a spatial de-interlacing process similar to the one used to de-interlace the first image.

The de-interlaced first and second images may be combined using an exposure combination algorithm to produce a high dynamic range image.

The foregoing is merely illustrative of the principles of this invention which can be practiced in other embodiments.

What is claimed is:

1. An imager comprising:
    an array of pixels arranged in rows;
    control circuitry, coupled to the array of pixels, that captures a first image of a scene using a first exposure time for a first pair of adjacent rows and that captures a second image of the scene using a second exposure time for a second pair of adjacent rows, wherein the control circuit is operable to capture the first and second images such that the first exposure time for all of the pixels in the first pair of adjacent rows ends simultaneously at a first time, such that the second exposure time for all of the pixels in the second pair of adjacent rows ends simultaneously at a second time, and such that the first and second times are different from each other.

2. The imager defined in claim 1 wherein the first pair of adjacent rows and the second pair of adjacent rows are interleaved together in the array of pixels, wherein the first and second exposure times at least partially overlap in time, and wherein the first and second images respectively comprise first and second interlaced images of the scene.

3. The imager defined in claim 2 wherein each of the pixels comprises a photosensitive element that accumulates charge in response to incident light from the scene.

4. The imager defined in claim 3 wherein each of the pixels further comprises a storage element and a transfer transistor that conveys the accumulated charge to the storage element from the photosensitive element.

5. The imager defined in claim 4 wherein the storage element in each of the pixels comprises a diffusion node.

6. The imager defined in claim 3 wherein each of the pixels further comprises a reset transistor that has a gate and that is coupled between a power supply terminal and the storage element, the imager further comprising:
    reset lines coupled between the control circuitry and the pixels, wherein each of the reset lines is coupled to the gates of the reset transistors in a respective row of pixels.

7. The imager defined in claim 3 wherein each of the pixels in a given row comprises a readout transistor having a gate and wherein the control circuitry comprises image readout circuitry, the imager further comprising:
    read lines coupled between the control circuitry and the pixels, wherein each of the read lines is coupled to the gates of the readout transistors in a respective one of the rows of pixels; and
    readout lines coupled between the digital images sensors and the image readout circuitry, wherein, when the readout transistors in a given row of pixels are turned on by a read signal on the respective read line for that given row, the readout transistors in the given row connect each of the storage elements in the given row of pixels to a respective one of the readout lines.

8. Image sensing circuitry comprising:
    an array comprising rows and columns of pixels each of which includes a photosensitive element that generates a charge in response to incident light and a storage element that stores the charge; and
    first and second interleaved and separately controllable global transfer lines that control transfer of the charges to the storage elements, wherein the first global transfer line is operable to transfer the charges of all of the pixels in a first plurality of the rows of the array at a first time and wherein the second global transfer line is operable to transfer the charges of all of the pixels in a second plurality of the rows of the array at a second time that is different than the first time.

9. The image sensing circuitry defined in claim 8 further comprising first and second interleaved and separately controllable global reset lines that reset the photosensitive elements.

10. The image sensing circuitry defined in claim 8 further comprising a set of global reset lines that simultaneously reset the photosensitive elements for all of the pixels of the array.

11. The image sensing circuitry defined in claim 8 further comprising a color filter array that overlays the array of pixels, wherein the color filter array includes alternating green and red filters in odd-numbered rows of the array of pixels and alternating blue and green filters in even-numbered rows of the array of pixels, wherein the red filters in the odd-numbered rows are adjacent to the green filters in the even-numbered rows.

12. The image sensing circuitry defined in claim 8 wherein the array of pixels includes odd-numbered row pairs of the pixels and even-numbered row pairs of the pixels and wherein the odd-numbered row pairs and the even-numbered row pairs of pixels are interleaved together.

13. Image sensing circuitry comprising:
    an array of pixels each of which includes a photosensitive element that generates a charge in response to incident light and a storage element that stores the charge;

first and second interleaved and separately controllable global reset lines that reset the photosensitive elements; and first and second interleaved and separately controllable global transfer lines that control transfer of the charges to the storage elements, wherein:

the first global reset lines are configured to reset a first plurality of the pixels at a first time;

the second global reset lines are configured to reset a second plurality of the pixels at a second time;

the first global transfer line is configured to control transfer of the charges of the first plurality of the pixels to the storage elements at a third time;

the second global transfer line is configured to control transfer of the charges of the second plurality of the pixels to the storage elements at a fourth time;

the first, second, third, and fourth times are each different from each other; and the first and second global reset lines and the first and second global transfer lines are each coupled to a respective plurality of green pixels, a respective plurality of blue pixels, and a respective plurality of red pixels.

14. The imager defined in claim 1 wherein the control circuit is operable to capture the first and second images such that the first exposure time for all of the pixels in the first pair of adjacent rows starts at a third time and such that the second exposure time for all of the pixels in the second pair of adjacent rows starts at the third time.

15. The imager defined in claim 1 wherein the control circuit is operable to capture the first and second images such that the first exposure time for all of the pixels in the first pair of adjacent rows starts at a third time, such that the second exposure time for all of the pixels in the second pair of adjacent rows starts at a fourth time, and such that the third and fourth times are different from each other.

16. The imager defined in claim 1 wherein the control circuit is operable to capture the first and second images such that the first exposure time for all of the pixels in the first pair of adjacent rows starts at a third time, such that the second exposure time for all of the pixels in the second pair of adjacent rows starts at a fourth time, such that the third and fourth times are different from each other, and such that a difference between the third and fourth exposure times is approximately equal to a difference between the first and second exposure times.

17. The imager defined in claim 1 wherein the control circuit is operable to capture the first and second images such that the first exposure time for the first pair of adjacent rows is longer than the second exposure time for the second pair of adjacent rows and such that a point halfway through the second exposure time occurs at approximately the same time as a point halfway through the first exposure time.

\* \* \* \* \*